United States Patent
Kuwahara et al.

(10) Patent No.: US 8,744,456 B2
(45) Date of Patent: Jun. 3, 2014

(54) WIRELESS COMMUNICATION METHOD WITH PACKET SCHEDULING

(75) Inventors: Mikio Kuwahara, Hachioji (JP); Kenzaburo Fujishima, Kokubunji (JP); Masanori Taira, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 47 days.

(21) Appl. No.: 12/717,419

(22) Filed: Mar. 4, 2010

(65) Prior Publication Data

US 2010/0157930 A1 Jun. 24, 2010

Related U.S. Application Data

(63) Continuation of application No. 11/065,253, filed on Feb. 25, 2005, now abandoned.

(30) Foreign Application Priority Data

Jun. 30, 2004 (JP) ................................ 2004-193354

(51) Int. Cl.
*H04J 15/00* (2006.01)

(52) U.S. Cl.
USPC .......................................... 455/450; 455/574

(58) Field of Classification Search
USPC .......... 455/67.11, 115.1, 115.2, 115.3, 127.1, 455/424, 425, 450, 452.1, 509, 574; 370/329, 330
See application file for complete search history.

(56) References Cited

U.S. PATENT DOCUMENTS

| | | | |
|---|---|---|---|
| 5,448,750 A | 9/1995 | Eriksson et al. | |
| 5,535,207 A * | 7/1996 | Dupont | 370/433 |
| 6,052,594 A | 4/2000 | Chuang et al. | |
| 6,351,643 B1 | 2/2002 | Haartsen | |
| 6,553,021 B1 * | 4/2003 | Bishop et al. | 370/347 |
| 6,571,102 B1 * | 5/2003 | Hogberg et al. | 455/450 |
| 7,035,644 B1 | 4/2006 | Maruyama | |
| 7,142,888 B2 | 11/2006 | Okawa et al. | |
| 2002/0044543 A1 | 4/2002 | Okajima et al. | |
| 2003/0013451 A1 * | 1/2003 | Walton | 455/447 |
| 2003/0145064 A1 | 7/2003 | Hsu et al. | |
| 2004/0160942 A1 * | 8/2004 | Kelley et al. | 370/350 |
| 2004/0190482 A1 * | 9/2004 | Baum et al. | 370/347 |
| 2004/0260942 A1 * | 12/2004 | Jamieson et al. | 713/201 |
| 2005/0135308 A1 | 6/2005 | Vijayan et al. | |

FOREIGN PATENT DOCUMENTS

| | | |
|---|---|---|
| JP | 11-017644 | 1/1999 |
| JP | 2001-358691 | 12/2001 |
| JP | 2004-032077 | 1/2004 |
| WO | WO97/34385 | 9/1997 |
| WO | WO 99/31823 | 6/1999 |
| WO | WO 02/062002 | 8/2002 |

OTHER PUBLICATIONS

3GPP TR 25.892 V1.1.1 (May 2004)—3$^{rd}$ Generation Partnership Project; Technical Specification Group Radio Access Network; Feasibility Study for OFDM for UTRAN Enhancement; (Release 6).
Office Action (in Japanese) in Japanese Patent Appln. JP 2004-193354, mailed Jun. 16, 2009 (2 pgs.).

* cited by examiner

*Primary Examiner* — Myron Wyche
(74) *Attorney, Agent, or Firm* — Antonelli, Terry, Stout & Kraus, LLP.

(57) ABSTRACT

To reduce power consumption of a mobile station, this invention provides a wireless communication method for communicating between a base station and a plurality of terminals using a plurality of channels, the channels being slots obtained by dividing frequency-divided carriers by time, in which the base station allocates a set of the channels which is composed of a plurality of neighboring carriers and/or a plurality of successive slots for the each terminal, and the base station allocates at least one of the channels included in the channel sets for packet transmission the terminals.

14 Claims, 27 Drawing Sheets

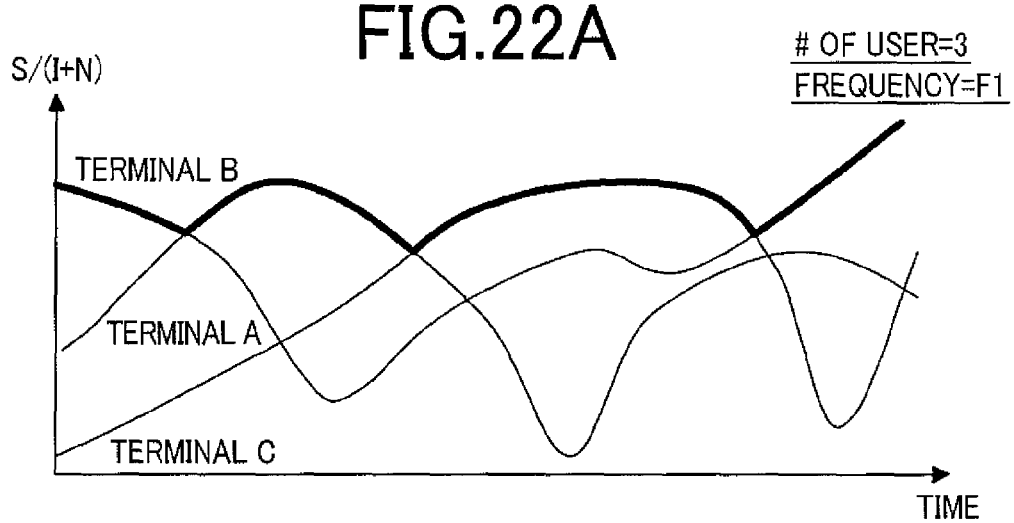
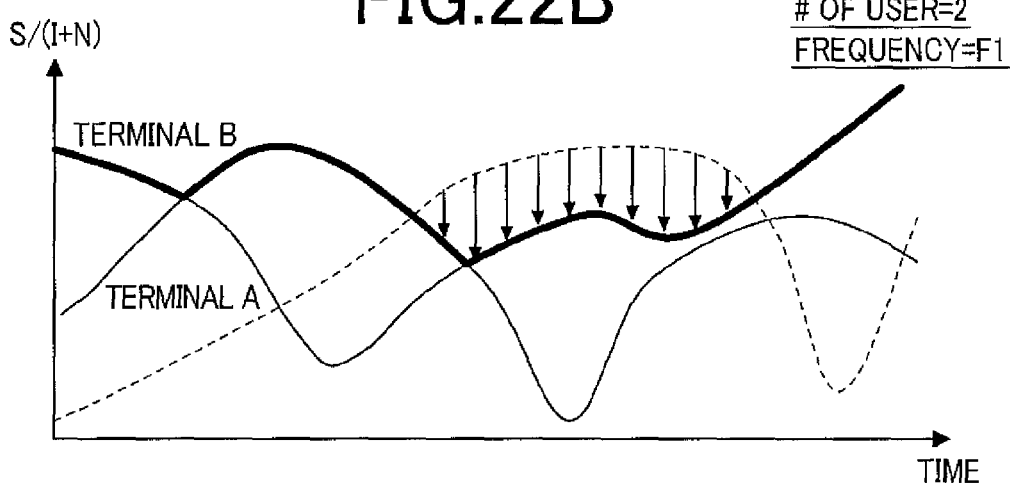
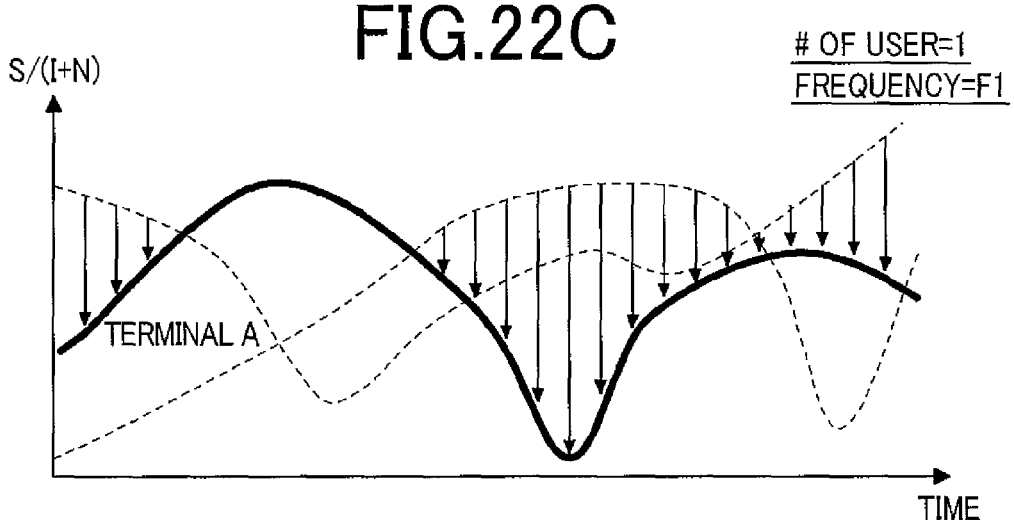

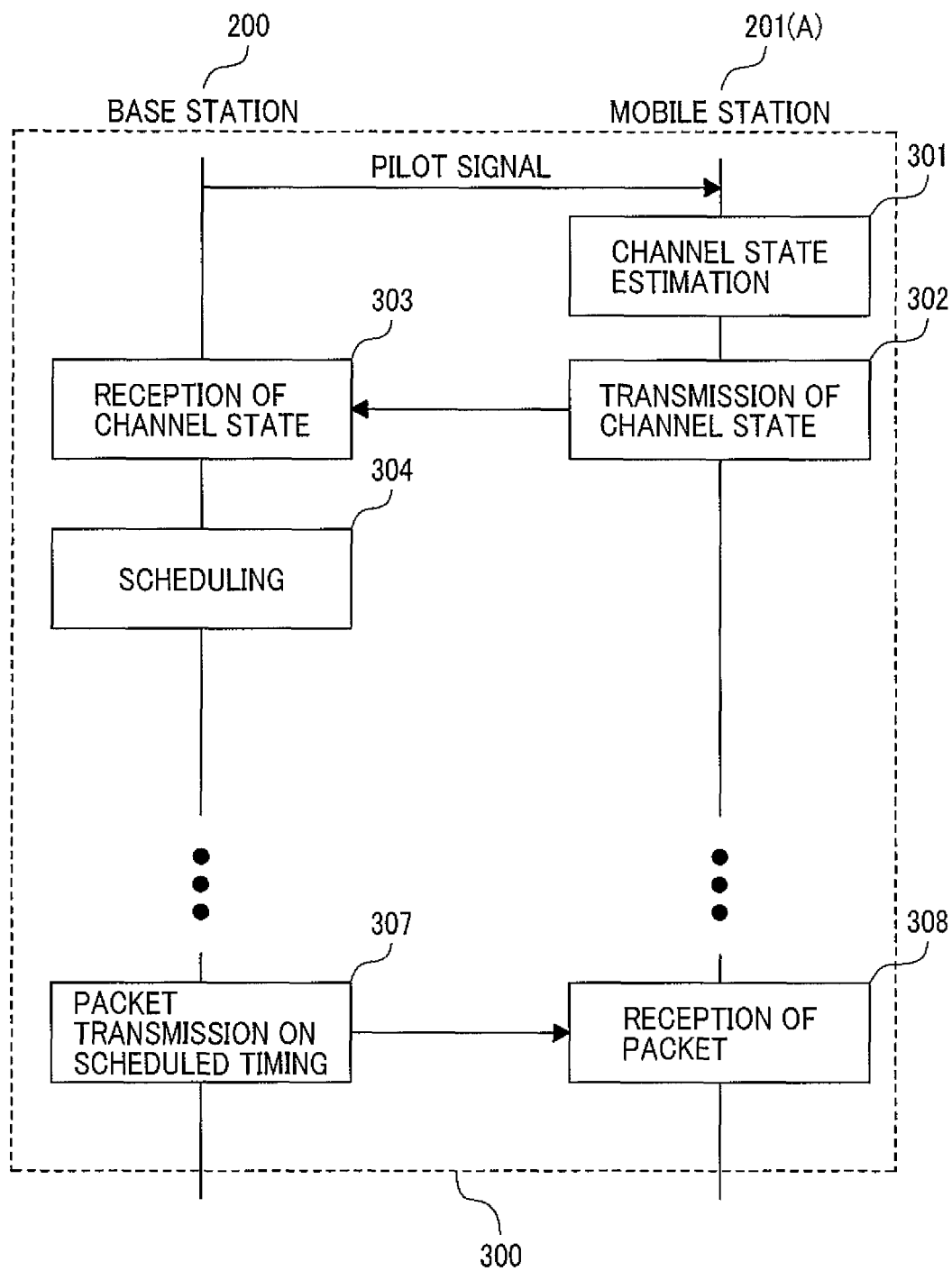

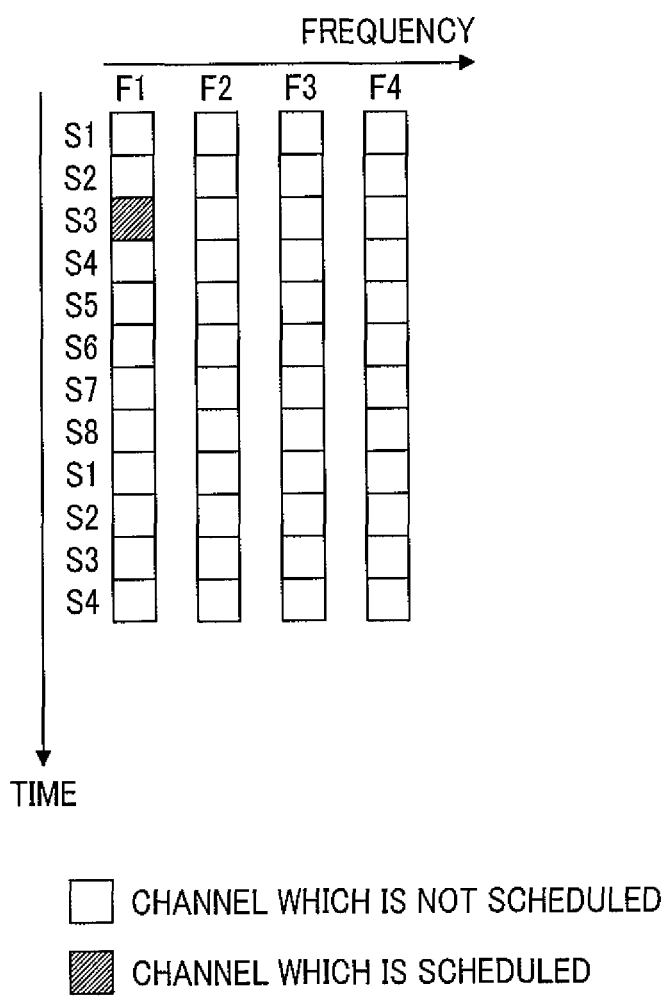

WIRELESS COMMUNICATION METHOD WITH PACKET SCHEDULING

CROSS-REFERENCE TO RELATED APPLICATION

This application is a continuation of U.S. application Ser. No. 11/065,253, filed Feb. 25, 2005, now abandoned and which application claims priority from Japanese application P2004-193354 filed on Jun. 30, 2004, the entire contents of which are hereby incorporated by reference into this application.

BACKGROUND OF THE INVENTION

This invention relates to a mobile wireless communication system including a wireless base station and wireless communication terminals, and more particularly to a technique for packet scheduling.

In the downlink communication (from a base station to a mobile station) in the cdma2000 1x-EV DO system, the base station divides time into units (slots) of 1/600 second, and the base station communicates only with a single mobile station in one slot (channel) at a certain frequency and switches the communicating station for each channel to communicate with a plurality of mobile stations.

Mobile stations receive pilot signals from the base station, estimate channel states from the pilot signals, and send the results of channel state estimation (channel state information) to the base station. The base station determines, on the basis of the received channel state information, to which mobile station the next channel should be allocated for packet transmission. The allocation of channels is called packet scheduling. The packet scheduling will be described referring to FIG. 30.

FIG. 30 shows a conventional channel schedule table, where the vertical axis shows time and the horizontal axis shows frequency. The frequency band is divided into carriers F1 to F4 and a certain length of time is divided into slots S1 to S8, so as to form time- and frequency-divided channels.

A mobile station A determines which of the carriers F1 to F4 it should use for communication. Specifically, the mobile station A monitors a reference first carrier stored in SRAM of the mobile station A and judges from broadcast information whether the first carrier is filled up by other mobile stations. When the first carrier is not filled, the mobile station A sends its own control information to the base station to register its position.

On the other hand, when the first carrier is filled up, the mobile station A monitors another, second carrier. Similarly, when the second carrier is filled, the mobile station A monitors a third carrier, so as to determine which carrier to use for communication.

In this example, the mobile station A determines to communicate on the carrier F1. Then, the mobile station A estimates channel states of the individual slots S1 to S8 of the carrier F1 and sends the channel state information to the base station. As stated earlier, the base station allocates channels on the basis of the channel state information from each mobile station. As for the mobile station A, the base station judges that the channel state of the slot S3 is good and allocates (schedules) the channel of the slot S3 of the carrier F1 for the mobile station A.

The mobile station A may communicate using a plurality of carriers. For example, JP 2003-9240 A describes a technique in which a mobile station A communicates using a plurality of carriers. The technique will be described referring to FIG. 31.

FIG. 31 shows a conventional channel schedule table, where the vertical axis shows time and the horizontal axis shows frequency.

The base station communicates with a plurality of mobile stations using carriers F1 to F8. Here, the base station and the mobile station A communicate at a low rate.

First, the base station determines to allocate three carriers to the mobile station A for communication. The base station may allocate the plurality of carriers F1, F4, and F8 to the mobile station A so that the frequency differences between the allocated carriers exceed a predetermined value. After that, the base station sends packets to the mobile station A using the carrier F1, the carrier F4, and the carrier F8. In this case, the mobile station A sends, to the base station, channel state information for each of the slots S1 to S8 on the carriers F1, F4, and F8. The base station performs scheduling on the basis of the channel state information from each mobile station. The base station judges that the channel states of the channel of the slot S3 of the carrier F1, the channel of the slot S4 of the carrier F4, and the channel of the slot S7 of the carrier F8 are good and schedules these channels for the mobile station A. The base station then sends packets to the mobile station A over the scheduled channels.

SUMMARY OF THE INVENTION

According to the conventional technique above, the mobile station has to monitor a wide frequency band because the plurality of carriers are allocated such that frequency differences between the allocated carriers are over a predetermined value. This requires that the mobile station be equipped with a plurality of RF units or a wideband RF unit, for separation of carriers in the baseband unit. Then the mobile station requires a large circuit scale and consumes increased power.

An object of this invention is to reduce power consumption of a mobile station while suppressing its circuit scale.

The embodiment of this invention provides a wireless communication method for communicating between a base station and a plurality of terminals using a plurality of channels, the channels being slots obtained by dividing frequency-divided carriers by time, characterized in that the base station allocates a set of the channels which is sets each composed of at least a plurality of neighboring carriers and/or a plurality of successive slots for the each terminal; and the base station allocates at least one of the channels included in the channel sets for packet transmission to the terminals.

According to the embodiment of this invention, it is possible to reduce power consumption of a mobile station.

This invention is applicable to carrier scheduling in mobile communication systems and can be advantageously applied to a system in which high-rate and low-rate mobile stations are present together. Also, while the embodiments have shown examples adopting the FDMA and OFDMA, this invention is applicable also to other multiplexing systems.

BRIEF DESCRIPTION OF THE DRAWINGS

The present invention can be appreciated by the description which follows in conjunction with the following figures, wherein:

FIGS. 22A to 22C are graphs showing carrier channel states according to the first embodiment of this invention;

FIG. 23 is a sequence chart of a packet scheduling process according to a second embodiment of this invention;

FIG. 30 is a conventional channel schedule table; and

DETAILED DESCRIPTION OF THE PREFERRED EMBODIMENTS

Figure 1:
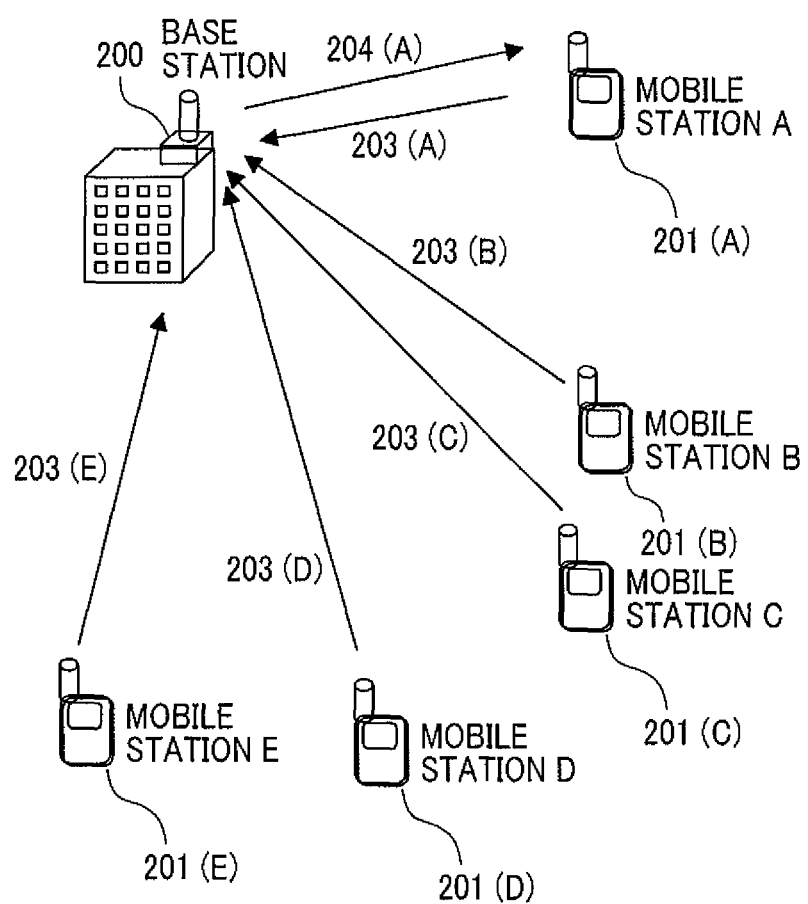
FIG. 1 is a diagram showing a configuration of a wireless communication system according to an embodiment of this invention.

Embodiments of this invention will be described below referring to the drawings.

FIG. 1 is a diagram showing a configuration of a wireless communication system according to a first embodiment of this invention.

The wireless communication system of the embodiment includes a base station 200, a mobile station A201(A), a mobile station B201(B), a mobile station C201(C), a mobile station D201(D), and a mobile station E201(E). The mobile station A201(A), the mobile station B201(B), the mobile station C201(C), the mobile station D201(D), and the mobile station E201(E) are within an area where they can communicate with the base station 200.

All mobile stations 201 receive pilot signals from the base station 200, estimate channel states of the downlinks (from the base station to the mobile stations), and send the estimated channel states (channel state information 203) to the base station 200. The base station 200 performs scheduling on the basis of the channel state information 203 from the mobile stations 201. The base station 200 sends packets to the mobile stations 201 according to the scheduling (204).

Figure 2:
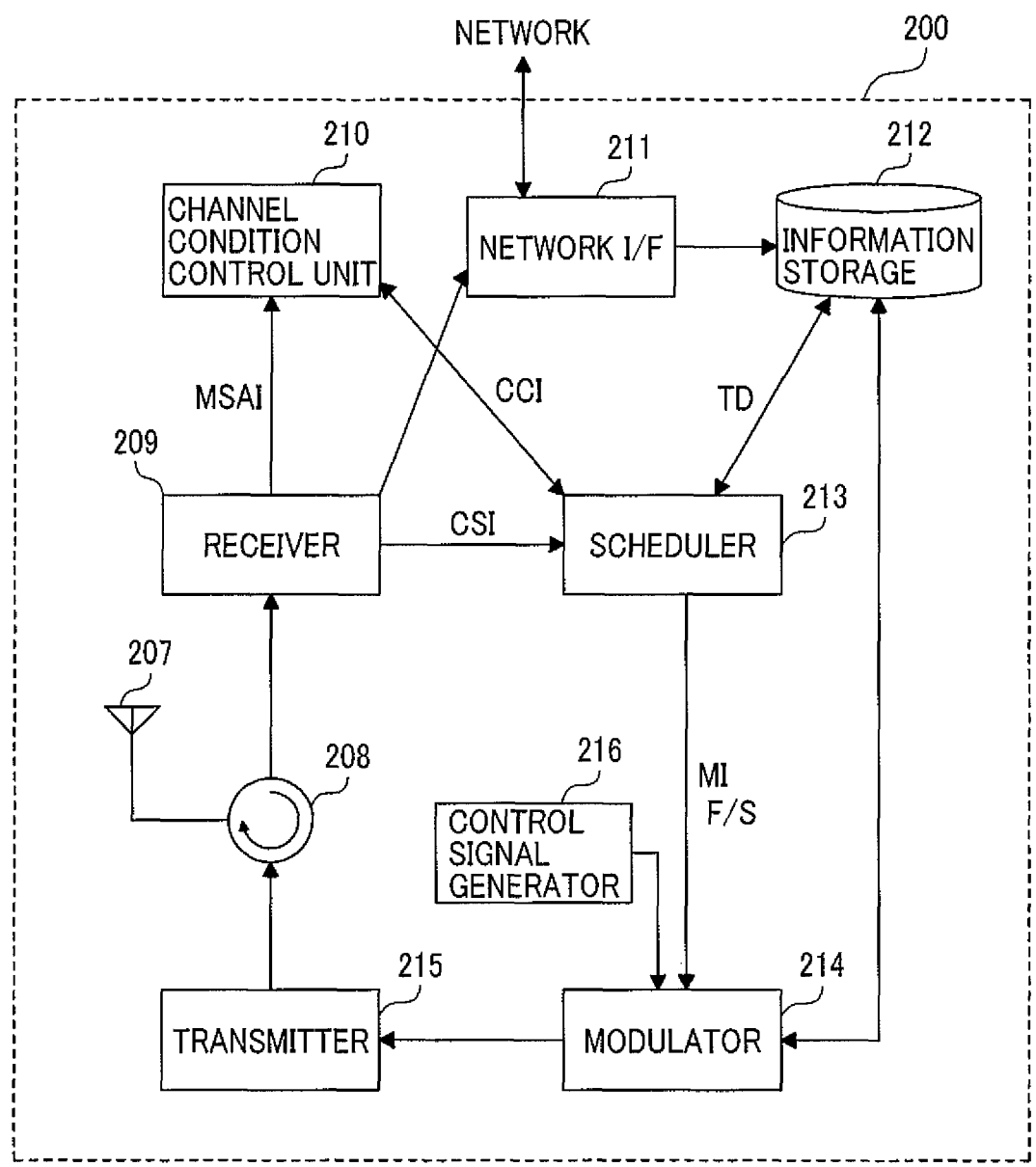
FIG. 2 is a block diagram of a base station according to a first embodiment of this invention.

FIG. 2 is a block diagram of the base station 200 of the first embodiment.

An antenna 207 transmits or receives signals to or from the mobile stations 201. A circulator 208 sends signals received at the antenna 207 to a receiver 209 and sends transmit signals generated in a transmitter 215 to the antenna 207.

The receiver 209 performs high-frequency and intermediate-frequency amplification, detection, etc., and converts a radio signal into a baseband signal. After that, the receiver 209 performs baseband signal demodulation, decoding, and error correction. Then, when a signal from the antenna is receiving ability information (MSAI) about a mobile station, the receiver 209 sends the information to a channel condition control unit 210, and when the signal is channel state information (CSI), the receiver 209 sends the information to a scheduler 213, and when the signal is user data, the receiver 209 sends the data through a network interface 211.

The channel condition control unit 210 allocates channel sets, as will be described later, on the basis of the receiving ability information about mobile stations, and stores information about the allocated channel sets (CCI). Also, the channel condition control unit 210 sends the channel set information to the scheduler 213 when needed.

An information storage 212 obtains, from a network and through the network interface 211, mobile station user data and signals to be transmitted to the mobile stations, and stores the data and signals. Also, the information storage 212 generates and stores management information (TD) for the mobile stations using past mean transmission rates of the mobile stations, and the like. Also, the information storage 212 sends, to a modulator 214, the stored mobile station user data and the stored signals to be transmitted to the mobile stations.

The scheduler 213 performs scheduling on the basis of the channel set information, referring to the channel state information and the management information about the mobile stations. Then, according to the scheduled packet transmitting timing, the scheduler 213 sends coding information (MI) about the mobile stations, information about signal transmitting carriers (F/S), etc., to the information storage 212 and to the modulator 214.

A control signal generator 216 generates information for controlling the transmitter 215 and sends the information to the modulator 214.

The modulator 214 encodes a signal transmitted to a mobile station on the basis of the coding information about the mobile station, the information about transmitting carriers, etc. from the scheduler. Also, the modulator 214 multiplexes the signal with the control information from the control signal generator 216. The modulator 214 then sends the multiplexed signal to the transmitter 215. The transmitter 215 converts the signal to an RF signal and transmits the signal to the mobile station 201 through the circulator 208 and from the antenna 207.

Figure 3:
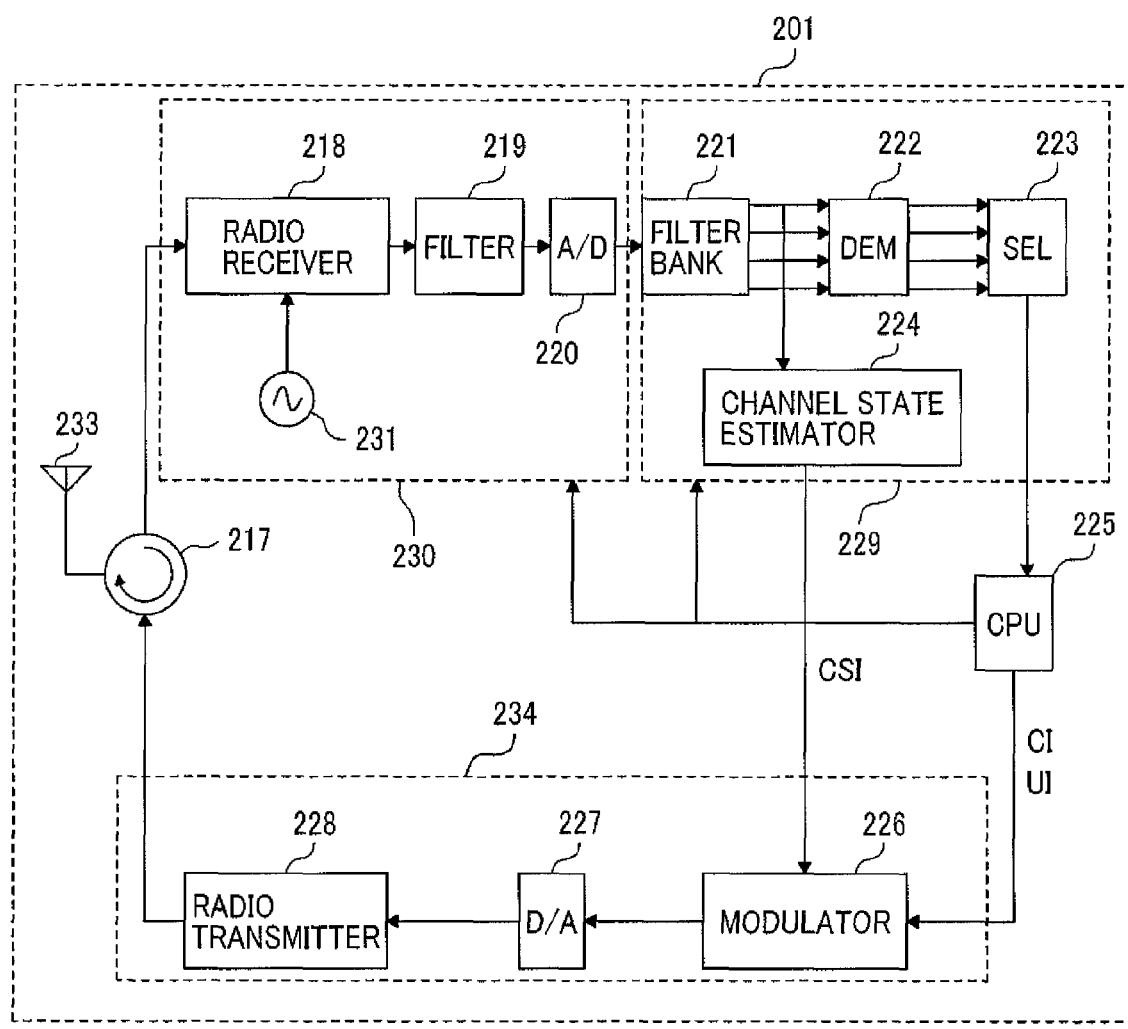
FIG. 3 is a block diagram of a mobile station according to the first embodiment of this invention.

FIG. 3 is a block diagram of a mobile station according to the first embodiment, which shows a configuration for FDMA.

An antenna 233 transmits or receives signals to or from the base station 200. A circulator 217 provides signals received at the antenna 233 to a radio receiver 218 and provides transmit signals generated in a radio transmitter 228 to the antenna 233.

A receiving RF unit 230 includes the radio receiver 218, a filter 219, an A/D converter 220, and a generator 231.

The generator 231 generates a high-frequency signal at a particular frequency (a local oscillator signal) and provides the signal to the radio receiver 218. The radio receiver 218 converts frequencies of signals from the base station 200 using the local oscillator signal.

The filter 219 removes unwanted frequency components other than the signals from the base station 200 that have been converted in frequency. The filter 219 may be capable of switching filters 219 for extracting different frequency ranges so that different filters can be used for signals of different data transmission rates (or according to the signal bandwidth) (e.g. when different filters are used for call service and broadband communication service). The A/D converter 220 converts the signal from the filter to a digital signal.

A baseband processing unit 229 includes a filter bank 221, a demodulator 222, a selector 223, and a channel state estimator 224.

The filter bank 221 extracts signals of individual carriers from the digital-converted signal, using filters appropriate for the carriers. Also, the filter bank 221 sends the extracted signals of individual carriers to the demodulator 222 and the channel state estimator 224.

The demodulator 222 demodulates the sent signals of individual carriers. The selector 223 extracts destination information from the demodulated signals, and when the own mobile station is the destination, the selector 223 sends the signal to a CPU 225. On the other hand, when the own mobile station is not the destination, the selector 223 discards the signal.

The channel state estimator 224 estimates channel states (S/I) from pilot signals inserted in signals of individual carriers. However, as will be described later, the channel state estimator 224 estimates channel states only about carriers allocated as a channel set. This is because no packets are transmitted on channels of other carriers.

When the mobile station 201 further obtains a data transmission rate, the channel state estimator 224 obtains the data transmission rate by referring to a table in which the channel state information and data transmission rate are associated with each other.

The CPU 225, controlling the entirety of the receiver 201, controls reception or transmission of information from or to the base station 200. The CPU 225 may be equipped with a timer. The timer manages operating/idle times of the receiver. In an idle period, the CPU 225 provides control to cut off the power to the RF unit 230, the baseband processing unit 229, and a signal transmitter unit 234. On the other hand, immediately before a switch to an operating time, the CPU 225 provides control to supply power to the RF unit 230, the baseband processing unit 229, and the signal transmitter unit 234.

The signal transmitter unit 234 includes a modulator 226, a D/A converter 227, and the radio transmitter 228.

The modulator 226 generates a modulated signal on the basis of information input from the CPU 225 that is to be transmitted to the base station, information about transmitting carriers (CI), user ID (UI), and channel state (CSI) input from the channel state estimator 224. The D/A converter 227 converts the modulated signal, generated by the modulator 226, to an analog signal. The radio transmitter 228 converts the analog-converted signal to the frequency of the carrier sent to the base station and amplifies the signal to required power. The amplified signal is transmitted to the base station 200 from the antenna 233 through the circulator 217.

FIGS. 4A to 4D show spectra exhibited during a process of extracting a signal of a particular carrier in the first embodiment.

Figure 4A:
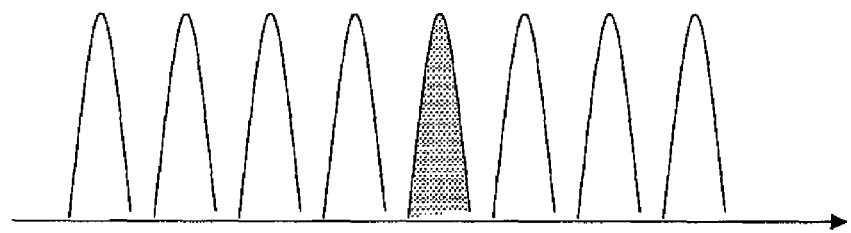
FIGS. 4A to 4D show spectra exhibited during a process of extracting a signal of a particular carrier according to the first embodiment of this invention.

The antenna 233 receives a signal having a spectrum as shown in FIG. 4A. The signal received at the antenna 233 includes signals on all carriers.

Figure 4B:
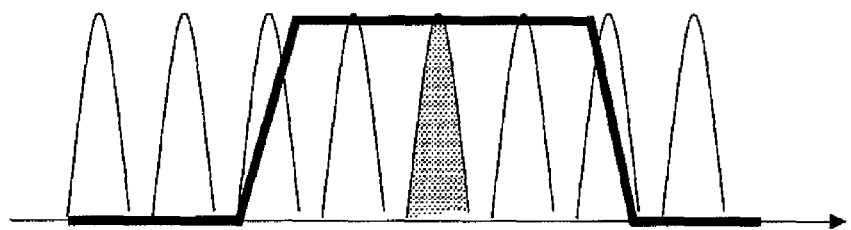

With this signal, the filter 219, shown by the bold line in FIG. 4B, extracts carriers necessary for the mobile station. Specifically, as will be described later, the filter 219 extracts signals such that all carriers in the allocated channel set are included. Therefore, the output from the filter 219 is a wideband signal including a plurality of carriers (e.g. in this embodiment, a signal of a band including three carriers).

Figure 4C:
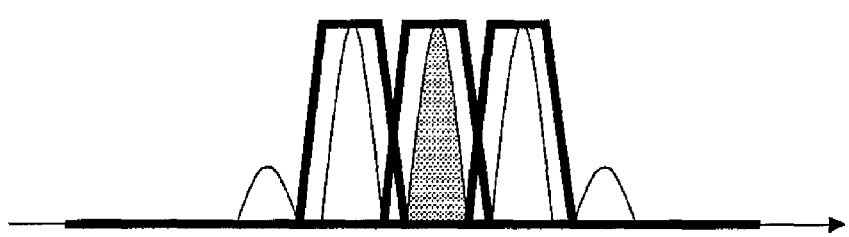
Figure 4D:
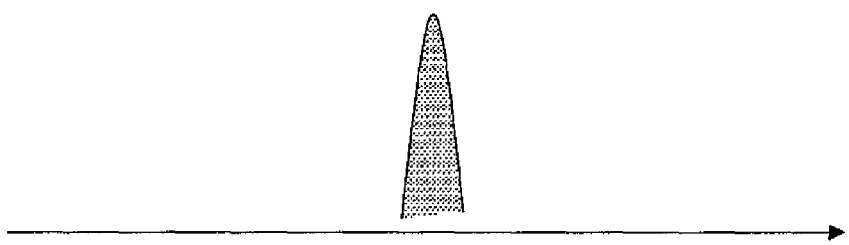

FIG. 4C shows the signal extracted by the filter. The filter bank 221 has filters adapted to individual carriers as shown by bold lines in FIG. 4C and extracts signals for the individual carriers. FIG. 4D shows the spectrum of one of the signals of the extracted carriers.

Figure 5:
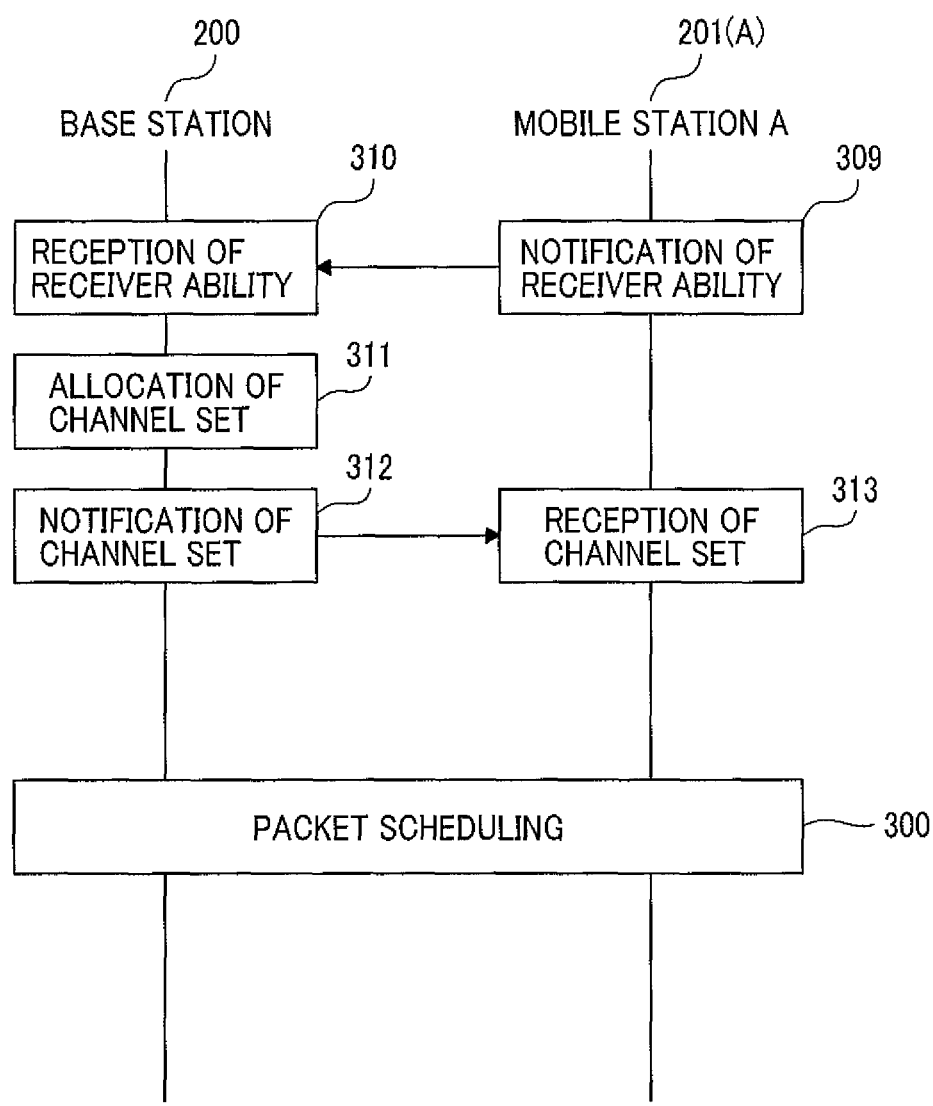
FIG. 5 is a sequence chart of a channel set allocation process according to the first embodiment of this invention, where a mobile station A reports its receiving ability.

FIG. 5 is a sequence chart of a process of allocating a channel set according to the first embodiment, which shows an example in which the mobile station A reports the receiving ability.

The receiving ability is the ability by which the mobile station A201(A) communicates with the base station 200, which can be a maximum communication rate of the mobile station A201(A), for example.

The description below shows an example in which the mobile station A201(A) uses a narrow band and a low rate.

First, the mobile station A201(A) notifies the base station 200 of the receiving ability using a control channel (309). For example, the notification may be performed when the mobile station A201(A) is powered up, or when the mobile station A201(A) starts communication with the base station 200, and this shows an example in which the mobile station A201(A) takes the leadership in the channel set allocation.

The base station 200 receives the receiving ability of the mobile station A201(A) (310) and allocates a channel set to satisfy the receiving ability. As will be described in detail later, the channel set means a plurality of channels in a sub-band formed of carriers that are continuous on the frequency axis and/or a sub-frame formed of slots that are continuous on the time axis.

The base station 200 notifies the mobile station A201(A) of the allocated channel set using a control channel (312). Then, in the subsequent communication with the mobile station A201(A), the base station 200 performs packet scheduling using the allocated channel set only (300). As will be described later, packet scheduling methods include a method in which the mobile station A201(A) is notified of the result of scheduling and a method in which the mobile station A201 (A) is not notified of the result.

The mobile station A201(A) receives the channel-set notification (313) and then monitors only the allocated channel set in the subsequent communication to receive packets from the base station 200.

Figure 6:
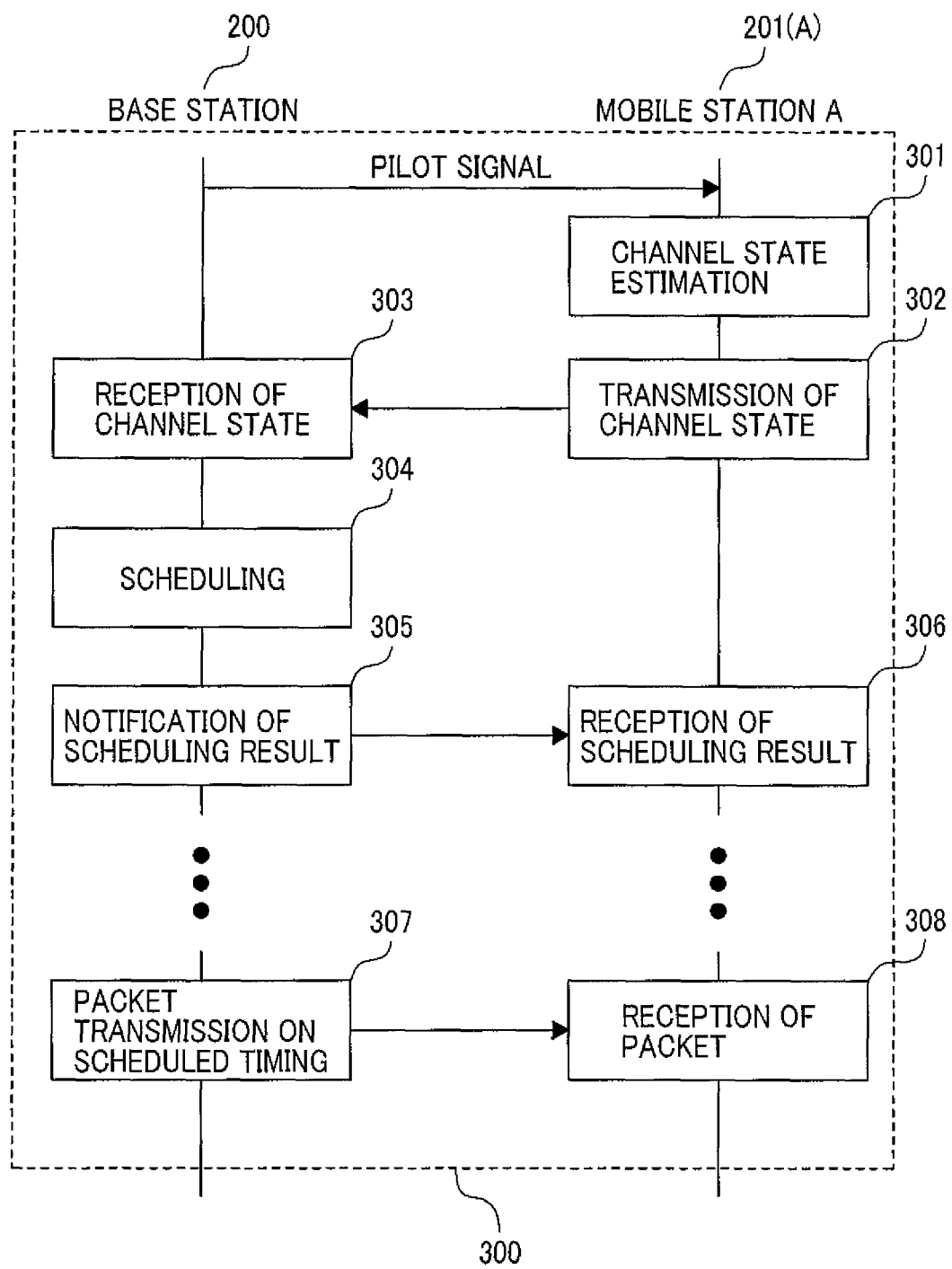
FIG. 6 is a sequence chart of a packet scheduling process performed in the channel set allocation process according to the first embodiment of this invention.

FIG. 6 is a sequence chart of the packet scheduling process performed in the step 300 of the channel set allocation process shown in FIG. 5, which shows an example in which the result of scheduling is reported.

The base station 200 transmits pilot signals with constant timing within the communicable area.

The mobile station A201(A) receives a pilot signal from the base station 200 and estimates the channel state from the pilot signal (301). For example, the channel state is estimated from receive field strength (RSSI), carrier signal to interference wave ratio (CIR), desired wave to interference wave ratio (SIR), etc.

The mobile station A201(A) transmits the result of estimated channel state (channel state information) to the base station 200 (302). The base station 200 receives the channel state information (303) and allocates channels (performs scheduling) for packet transmission on the basis of the channel state information (304). During the scheduling, the base station 200 calculates an evaluation function described later and allocates channels to mobile stations of highest evaluation function values. The base station 200 then notifies the mobile station A201(A) of the result of the scheduling (305).

The mobile station A201(A) receives the result of the scheduling (306). Then, according to the result of the scheduling, the mobile station A201(A) waits for reception in the channels in which the base station 200 transmits packets.

The base station 200 transmits packets on the scheduled channels (307) and the mobile station A201(A) receives the packets (308).

Figure 7:
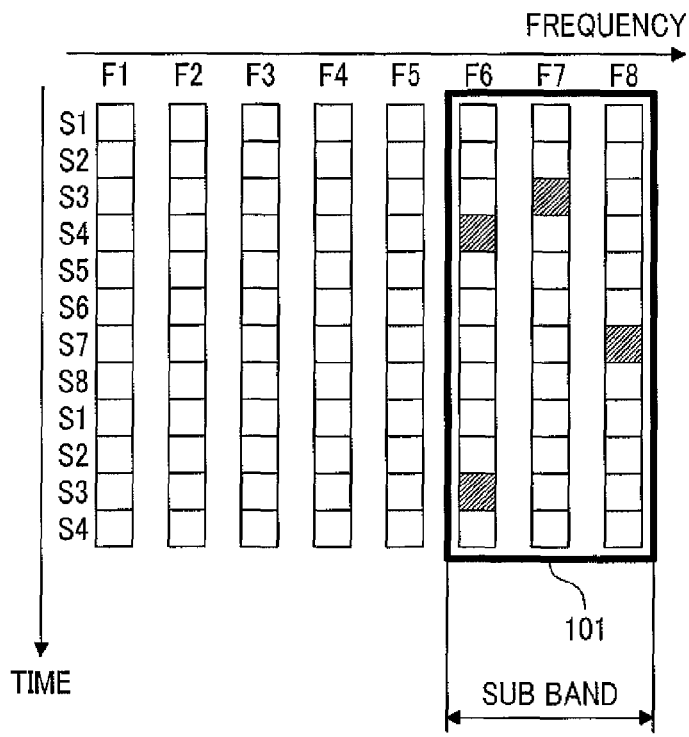
FIG. 7 is a channel schedule table according to the first embodiment of this invention, where a channel set is allocated on the basis of frequency.

FIG. 7 shows a channel schedule table in an example of the first embodiment in which a channel set is allocated on the basis of frequency, where the vertical axis shows time and the horizontal axis shows frequency.

The base station 200 communicates with a plurality of mobile stations 201 using the carriers F1 to F8. The mobile station A201(A) and the base station 200, which communicate at a low rate, do not have to perform communication using all carriers.

Accordingly, the base station 200 allocates to the mobile station A201(A) a channel set including the three carriers F6 to F8 at continuous frequencies. A plurality of carriers of continuous frequencies, like the carriers F6 to F8, are called a sub-band. The allocation of a channel set is achieved by determining the number of carriers used for communication on the basis of the data transmission rate between the mobile station 201 and the base station 200.

The base station 200 transmits packets in the allocated channel set, without scheduling the other carriers F1 to F5 for the mobile station A201(A). Therefore, the mobile station A201(A) monitors only a sub-band 101 (the carriers F6 to F8) in the allocated channel set.

Specifically, the base station 200 transmits packets to the mobile station A201(A) over the channel of the slot S3 of the carrier F7, the channel of the slot S4 of the carrier F6, and the channel of the slot S7 of the carrier F8 that are scheduled for the mobile station A201(A).

Figure 8:
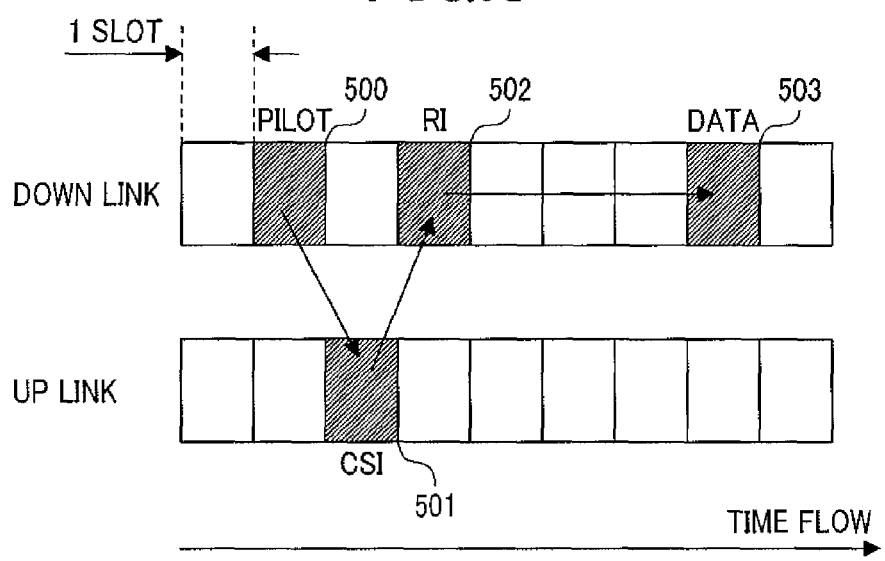
FIG. 8 is a channel timing chart according to the first embodiment of this invention.

FIG. 8 is a channel timing chart of the first embodiment. The hatched portions in FIG. 8 show timing of communication between the base station 200 and the mobile station A201(A).

The base station 200 transmits a pilot signal (Pilot) (500). The mobile station A201(A) receives the pilot signal and estimates the channel state from the received pilot signal. Then, the mobile station A201(A) transmits the channel state information (CSI) to the base station 200 in the slot next to the reception of the pilot signal (501).

The base station 200 receives the channel state information and performs scheduling. Then, the base station 200 transmits the result of scheduling (RI) to the mobile station A201(A) in the slot next to the reception of the channel state information (502). In this process, in order to reduce overhead caused by the transmission of the scheduling result, the base station 200 transmits the RI with increased spreading rate and reduced transmission power, or transmits the RI by intermittent transmission in a reduced transmission time.

Then, the base station 200 transmits data (Data) to the mobile station A201(A) with the scheduled timing (503).

Figure 9:
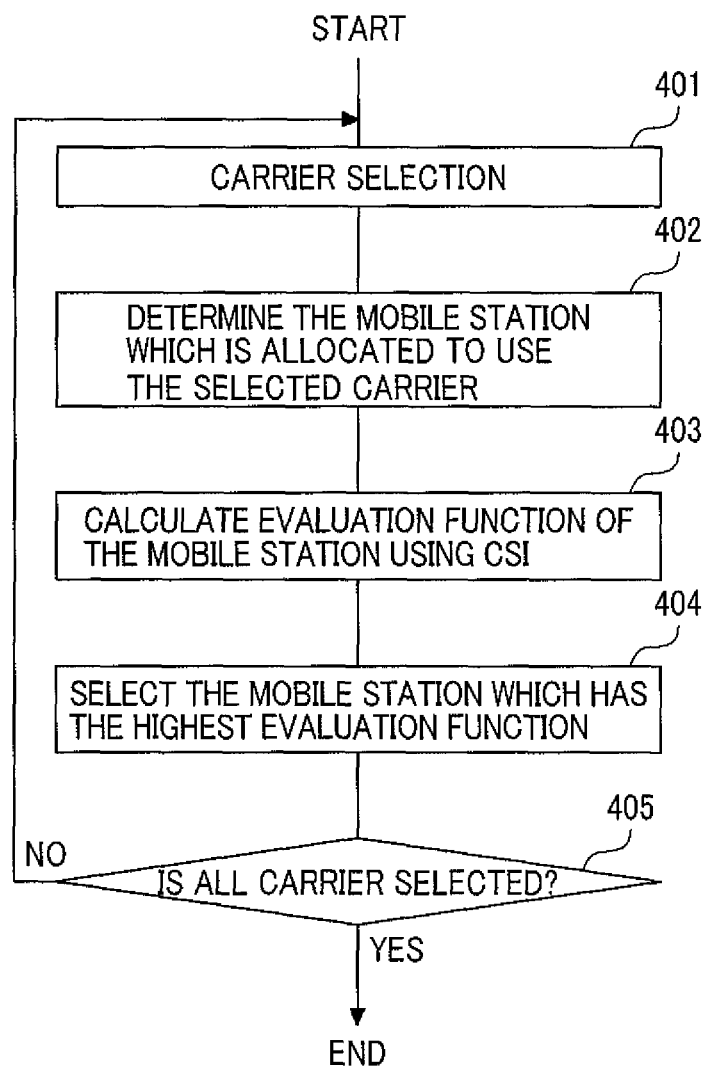
FIG. 9 is a flowchart of a scheduling process according to the first embodiment of this invention.

FIG. 9 is a flowchart of a scheduling process according to the first embodiment, which is performed by the base station 200.

The base station 200 selects one of the plurality of carriers (401). Next, the base station 200 specifies mobile stations 201 allocated to the selected carrier by referring to the channel condition module 210 (402). The channel condition module 210 allocates channel sets to all mobile stations 201 that communicate with the base station 200 and stores the allocated channel sets.

The base station 200 receives the channel state information about the selected carrier for all of the specified mobile stations and calculates the evaluation function (403).

For example, the calculation of the evaluation function uses proportional fairness, according to Expression 1.

$$\Phi = DRC/R \qquad \text{[Expression 1]}$$

Where DRC represents a data transmission rate based on the channel state information from the mobile station 201. The DRC can be determined by either of the base station 200 and the mobile station 201. When the base station 200 receives channel state information from a mobile station 201, the base station 200 refers to a table associating the channel state information and the DRC to obtain the DRC of that mobile station 201. Alternatively, the base station 200 may receive DRC that the mobile station 201 has obtained by referring to a given table.

The base station 200 divides DRC by the past mean data transmission rate (R) of the corresponding mobile station 201. This value is the evaluation function, which allows a judgement as to whether the DRC is higher or lower as compared with the past mean transmission rate. By making the allocation on the basis of the evaluation function, the base station 200 can perform scheduling while keeping fairness among all mobile stations 201.

The base station 200 compares evaluation function values of all mobile stations 201 specified in the step 402, selects a mobile station 201 with the highest evaluation function value, and performs scheduling to that mobile station 201 (404). Through these operations, the base station 200 completes the scheduling of the selected carrier. The base station 200 then checks whether all carriers have been selected, and when all carriers have not been selected yet, the base station 200 performs scheduling of a carrier not selected yet (405). When all carriers have been selected, the scheduling about this slot is completed.

Figure 10:
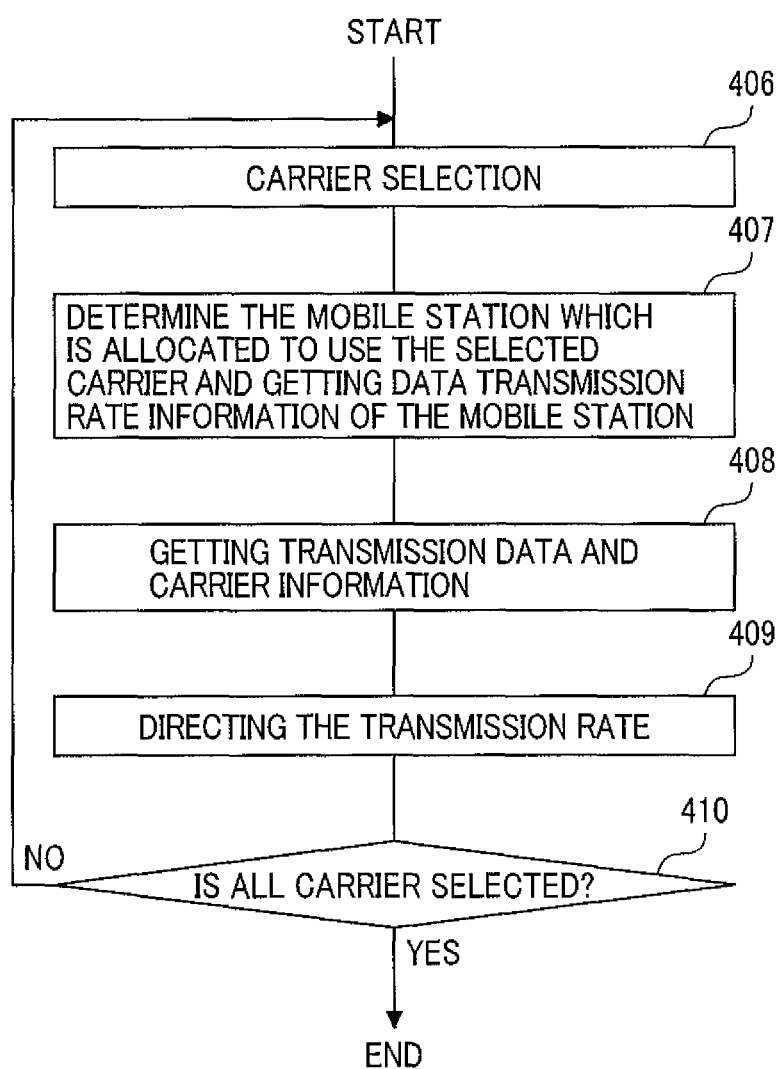
FIG. 10 is a flowchart of a process performed by the base station after the scheduling process according to the first embodiment of this invention.

FIG. 10 is a flowchart of a process performed by the base station 200 after the scheduling process of the first embodiment.

The base station 200 selects one of the plurality of carriers (406). Next, using the scheduling about the selected carrier, the base station 200 obtains information about the mobile station 201 to which a packet is transmitted, such as the ID and data transmission rate of the mobile station 201 (407).

Also, the base station 200 obtains, using the information storage 212, data to be transmitted to the mobile station 201 and information about the selected carrier (408). Since the amount of transmitted data depends on the data transmission rate, the scheduler 213 indicates the data transmission rate to the modulator 214 (409). The modulator 214 then informs the information storage 212 of the amount of information to be sent to the modulator 214 per unit time.

The base station 200 checks whether all carriers have been selected, and when all carriers have not been selected yet, the base station 200 makes preparations for packet transmission over a carrier not selected yet (405). When all carriers have been selected, the preparations for packet transmission about this slot are completed.

On the basis of these pieces of information, the base station 200 transmits data to scheduled mobile stations 201 over the channels of the selected carriers. The base station 200 transmits, to the mobile stations 201, data modulated according to a proper modulation method on the basis of the channel state information.

Figure 11:
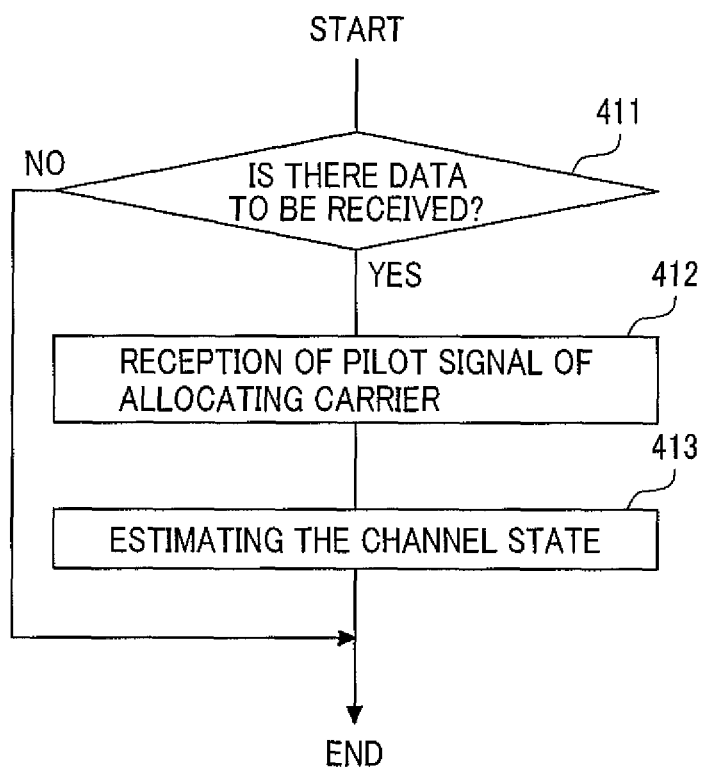
FIG. 11 is a flowchart of a channel state estimation process according to the first embodiment of this invention.

FIG. 11 is a flowchart of a channel state estimation process according to the first embodiment, which is performed by the mobile station A201(A).

The channel state estimation process is started and performed with an interrupt timed for each slot. First, the mobile station A201(A) checks whether there is any information to be received from the base station 200 (411). That is, the mobile station A201(A) checks whether it is being connected with the base station. When there is no information to be received, the mobile station A201(A) ends the process about this slot. On the other hand, when there is information to be received (when it is in a connected state), the mobile station A201(A) receives a pilot signal of an allocated carrier by using hardware designed to monitor carriers of the allocated channel set (412). For example, the hardware is implemented with an FIR filter that performs in-phase addition process of the pilot signal after FFT. Also in the frequency direction, when frequency correlation is high (when multi-path delay spread is small), correlation between adjacent sub-channels is high and so in-phase addition is possible.

Then, the mobile station A201(A) estimates the channel state of the allocated carrier from the received pilot signal (413). Now, the mobile station A201(A) may further obtain a data transmission rate from the estimated channel state by referring to a table associating the channel state and the DRC. The mobile station A201(A) transmits, to the base station 200, the result of channel state estimation (channel state information) about the allocated carrier, or the data transmission rate.

Figure 12:
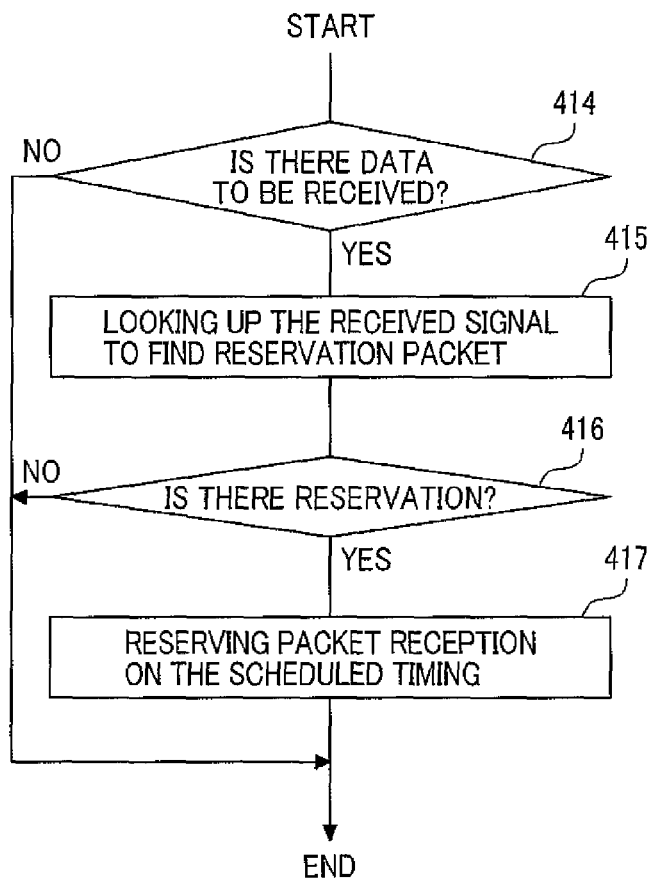
FIG. 12 is a flowchart of a scheduling result receiving process according to the first embodiment of this invention.

FIG. 12 is a flowchart of a process of receiving a result of scheduling according to the first embodiment, which is performed by the mobile station A201(A).

After transmitting the channel state information, the mobile station A201(A) checks whether a result of scheduling has been sent from the base station 200 (414). When no scheduling result has been sent from the base station 200, the mobile station A201(A) ends the scheduling result receiving process. On the other hand, when a scheduling result has been sent from the base station 200, the mobile station A201(A) checks the scheduling about the carriers of the allocated channel set from the received scheduling result (415).

The mobile station A201(A) checks whether the base station 200 sends a packet on a carrier allocated to the mobile station A201(A) (416). When no packet is sent from the base station 200, the mobile station A201(A) ends the scheduling result receiving process. On the other hand, when the base station 200 sends a packet, the mobile station A201(A) reserves packet reception in the channel of the corresponding slot and corresponding carrier on the basis of the scheduling result (417).

Figure 13:
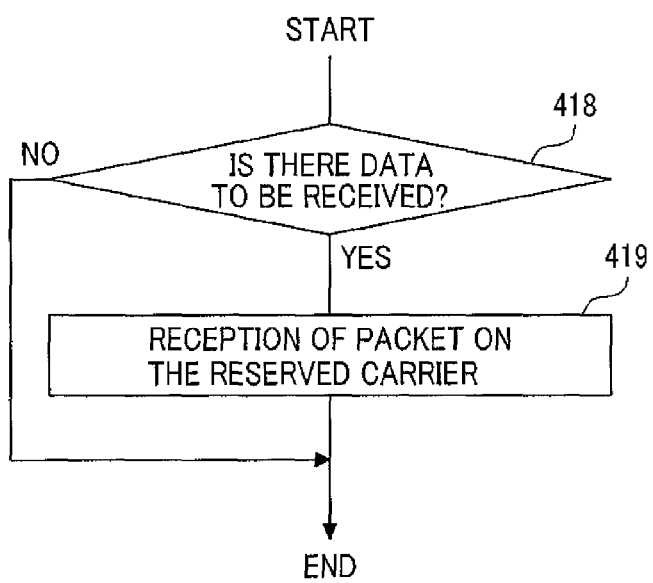
FIG. 13 is a flowchart of a packet receiving process according to the first embodiment of this invention.

FIG. 13 is a flowchart of a packet receiving process according to the first embodiment, which is performed by the mobile station A201(A).

This receiving process is started and performed with an interrupt timed for each slot. First, the mobile station A confirms the scheduling reserved in the step 417 and checks whether there is information to be received (418). When there is no information to be received, the mobile station A201(A) ends the packet receiving process in this slot. On the other hand, when there is information to be received, the mobile station A201(A) receives the packet over the scheduled channel (419).

Figure 14:
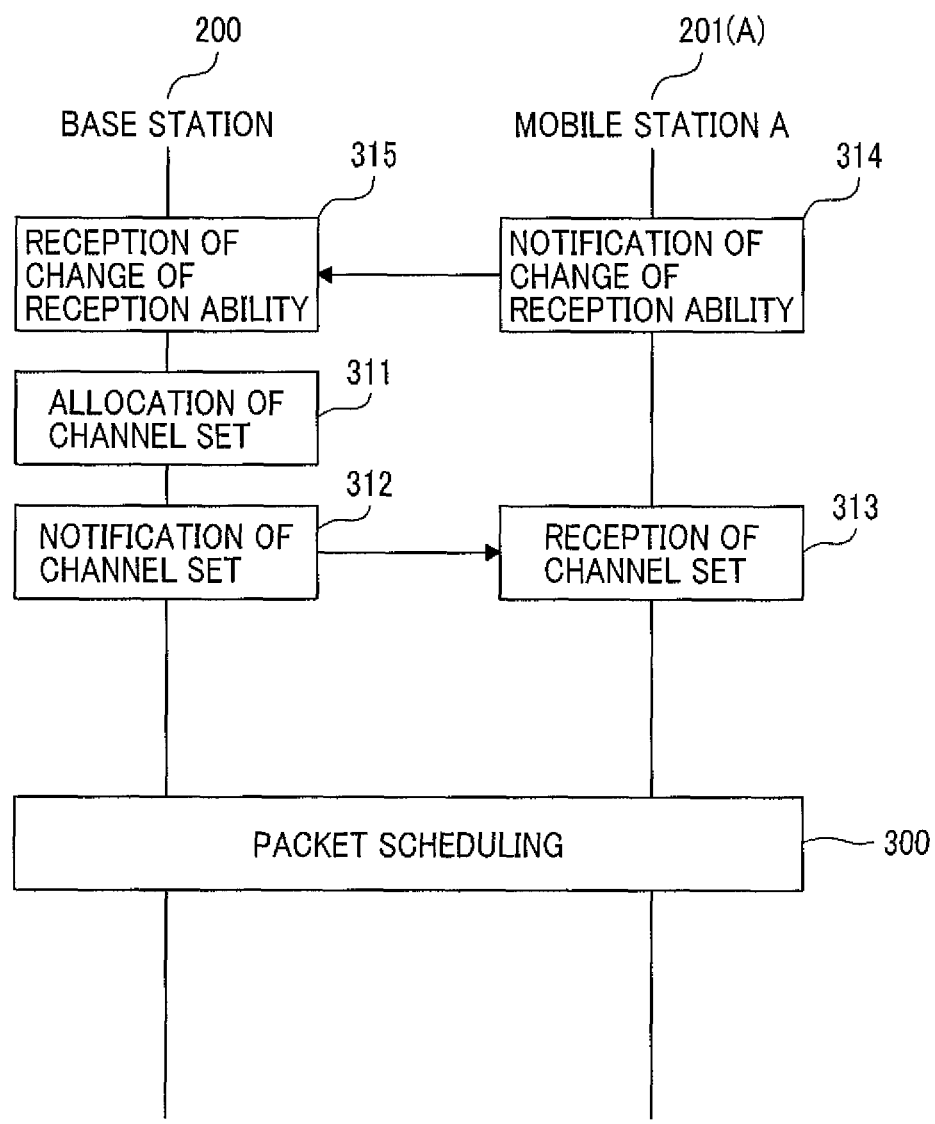
FIG. 14 is a sequence chart of a channel set allocation process according to the first embodiment of this invention, where the mobile station A reports a change of its receiving ability.

While the description above has shown a packet scheduling process that is performed when the mobile station is powered up and starts operating, a similar packet scheduling process is performed also when the mobile station 201 reports a change of its receiving ability, as shown in FIG. 14.

FIG. 14 is a sequence chart of a channel set allocation that is performed when the mobile station A201(A) of the first embodiment reports a change of its receiving ability.

The change of receiving ability of the mobile station A201(A) means a change of the data transmission rate of the mobile station A201(A) that takes place, for example, when the mobile station A201(A) switches from a voice call to a broadband communication. Such a change is usually made after the call has ended, but no problem arises when the change is made during the communication. When the communication is switched to a videoconference during a voice call, for example, the data transmission rate must be changed during the call, and this embodiment allows the data transmission rate to be changed as desired. In this invention, absence of this procedure of making a change during communication may cause inconvenience in use, because the band is changed depending on the processing ability of the mobile station and the service used. This embodiment solves this problem. The example above has shown a change from narrowband to wideband, it is clear that the same is true also with a change from wideband to narrowband.

The mobile station A201(A) notifies the base station 200 of the change of receiving ability through a control channel (314).

The base station 200 receives the change of receiving ability of the mobile station A201(A) (315) and allocates a channel set that satisfies the changed receiving ability (311). The base station 200 notifies the mobile station A201(A) of the allocated channel set using a control channel (312). The base station 200 then performs packet scheduling only about the allocated channel set (300).

The mobile station A201(A) receives the channel-set notification (313). The mobile station A201(A) then monitors only the allocated channel set in the subsequent communication to receive packets from the base station 200.

Receiving the channel-set notification, the mobile station A201(A) changes the local oscillating frequency outputted from the generator 231. Also, when the mobile station A201(A) changes the band depending on the received signal, the mobile station A201(A) switches the band limiting filter 219 and varies the sampling clock supplied to the A/D converter 220. Also, the filter bank 221 of the mobile station A201(A) changes the number of filters used for monitoring.

While an example of the first embodiment has been shown in which the mobile station 201 takes the leadership in the channel set allocation, the base station 200 may take the leadership in the channel set allocation.

Figure 15:
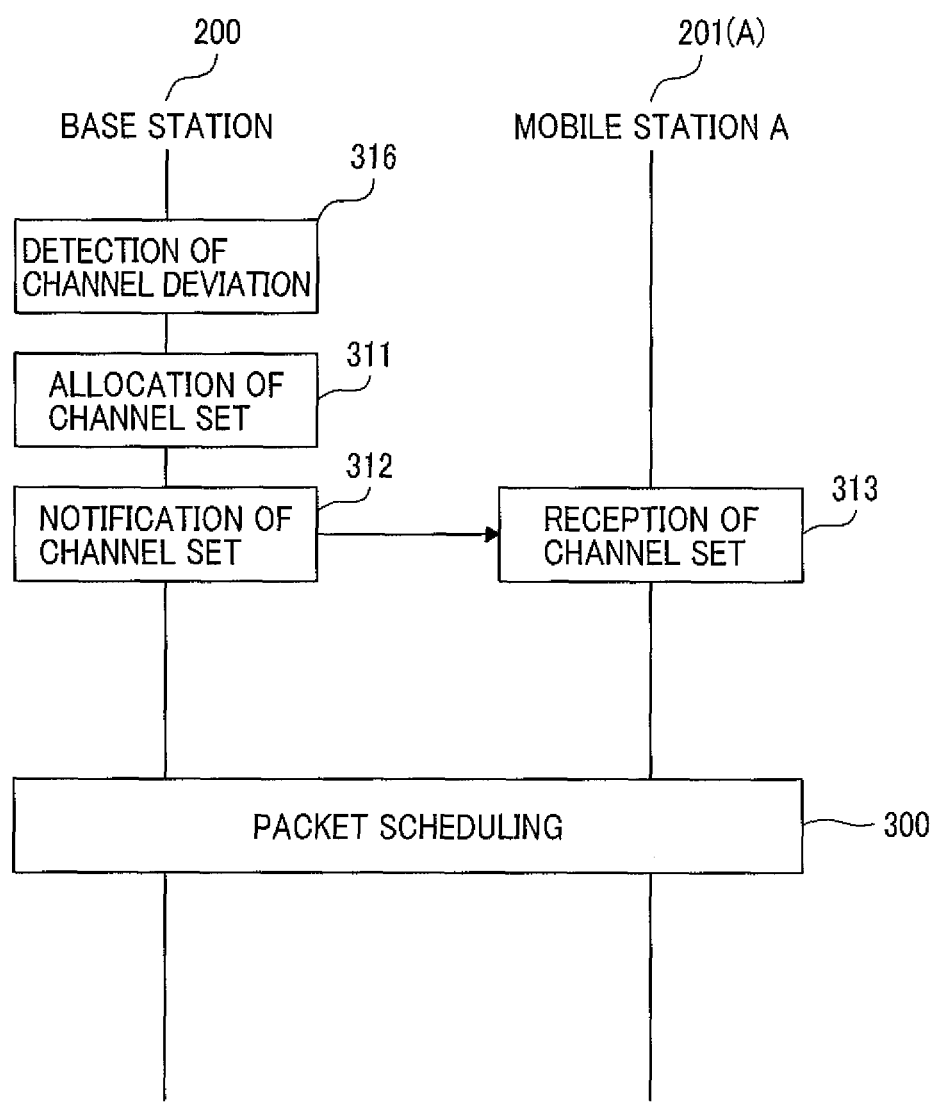
FIG. 15 is a channel set sequence chart according to the first embodiment of this invention, where the base station takes the leadership.

FIG. 15 is a channel-set sequence chart in an example in which the base station 200 of the first embodiment takes the leadership.

The base station 200 measures a utilization rate for each channel and detects a channel deviation (316). The channel deviation shows non-uniformity of channel utilization rates, where a larger channel deviation lowers the channel utilization rate.

The base station 200 allocates a channel set to an arbitrary mobile station 201 in a manner that reduces the channel deviation (311). For example, the base station 200 notifies the mobile station A201(A) of a change of channel set (312). The mobile station A201(A) receives the channel-set notification (313). Then, the base station 200 performs packet scheduling only about the allocated channel set (300).

The mobile station A201(A) receives the channel-set notification (313). The mobile station A201(A) then monitors only the allocated channel set in the subsequent communication to receive packets from the base station 200.

While this embodiment has so far shown examples in which channel sets are allocated on the basis of frequency, channel sets may be allocated on the basis of time in the first embodiment.

Figure 16:
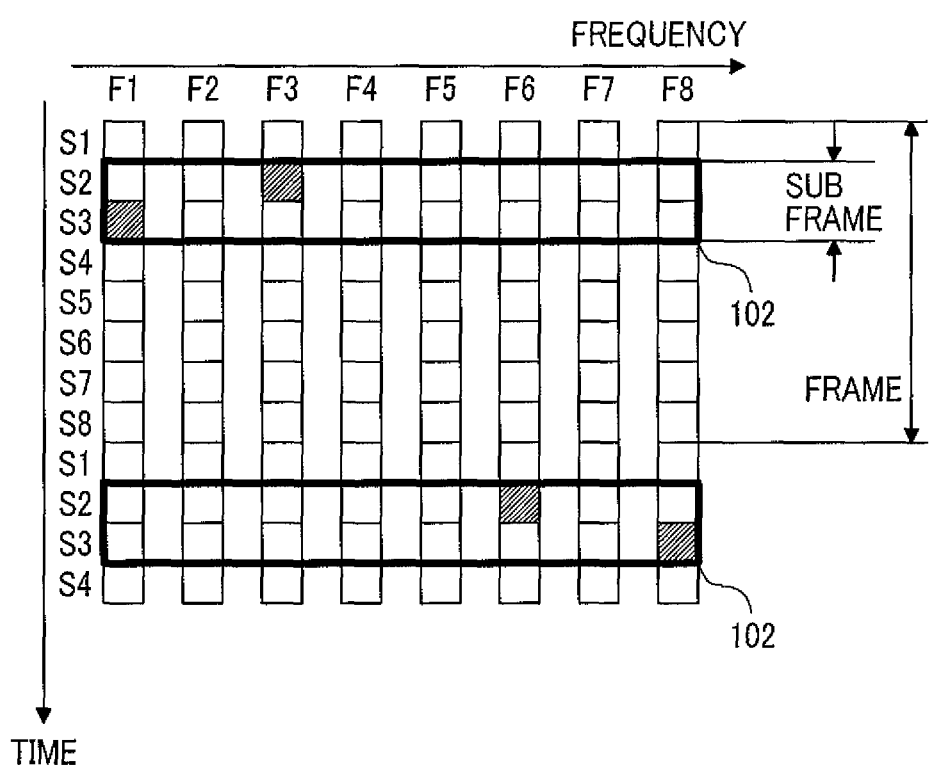
FIG. 16 is a channel schedule table according to the first embodiment of this invention, where a channel set is allocated on the basis of time.

FIG. 16 is a channel schedule table in an example of the first embodiment in which a channel set is allocated on the basis of time, where the vertical axis shows time and the horizontal axis shows frequency.

The base station 200 transmits packets to all mobile stations 201 by using the entire frame including the slots S1 to S8. In FIG. 11, when the base station 200 and the mobile station A201(A) communicate at a low rate, the base station 200 allocates carriers for communication to the mobile station A201(A), but the base station 200 may allocate time (slots) for communication in order to reduce power consumption.

The base station 200 allocates to the mobile station A201 (A) the two slots S2 and S3 that are continuous in time. Here, a group of time-continuous plural slots, like S2 and S3, is called a sub-frame 102.

The base station 200 transmits packets to the mobile station A201(A) in the slots of the allocated channel sets. Specifically, in the first frame, the base station 200 transmits packets to the mobile station A201(A) over the carrier-F3 slot-S2 channel and the carrier-F1 slot-S3 channel. In the next frame, the base station 200 transmits packets to the mobile station A201(A) over the carrier-F6 slot-S2 channel and the carrier F5 slot-S3 channel.

In this process, the mobile station A201(A) does not cause its circuitry to uselessly operate in the slots not allocated (S1 and S4 to S8), thereby achieving reduction of power consumption.

When starting operation, the mobile station A201(A) must perform overhead processing, such as initialization, and therefore allocating discontinuous slots causes power consumption for initialization etc. for every allocated slot. In order to reduce such power consumption, the base station 200 allocates continuous slots to the mobile station A201(A). That is, though the mobile station A201(A) has to perform initialization for the slot S2, it does not have to perform initialization for the slot S3, and allocating continuous slots thus reduces power consumption.

Figure 17:
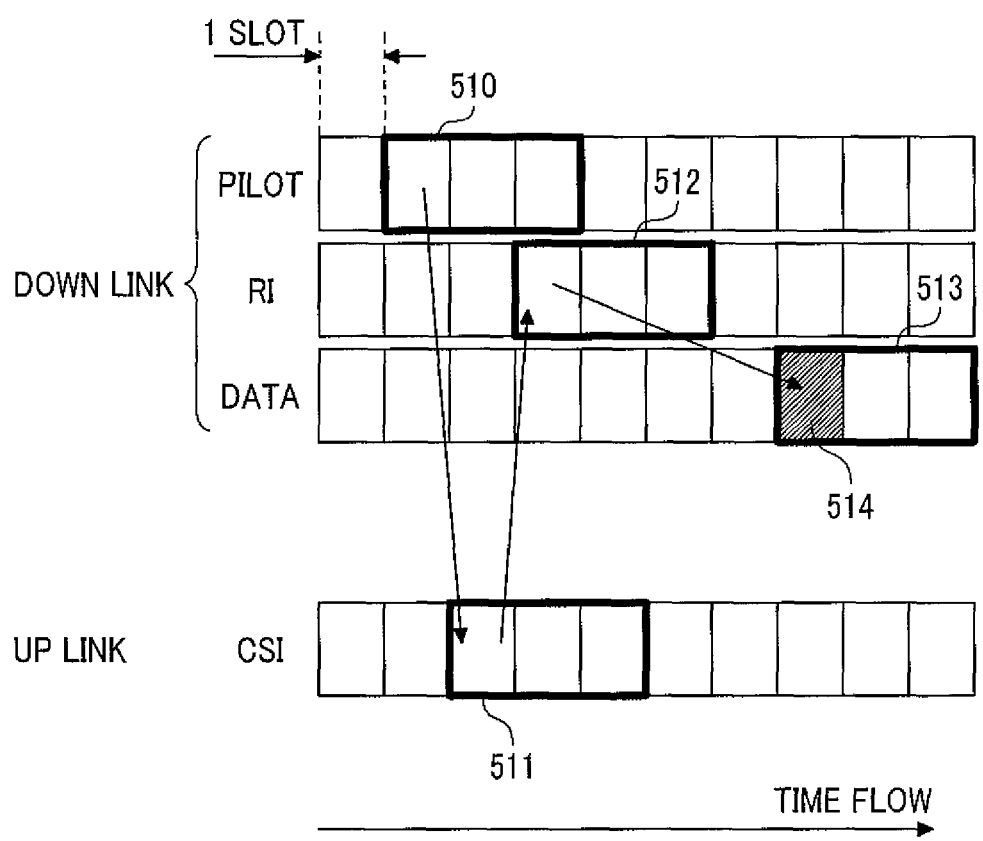
FIG. 17 is a channel timing chart according to the first embodiment of this invention, where a channel set is allocated on the basis of time and a result of scheduling is reported.

FIG. 17 is a channel timing chart according to the first embodiment, which shows an example in which a channel set is allocated on the basis of time and the result of scheduling is reported. The portions surrounded by bold lines indicate slots in which the base station 200 and the mobile station A201(A) associate with each other. The hatched portion shows a slot 514 in which the base station 200 transmits a packet to the mobile station A201(A).

The channel set is allocated on the basis of time and so the mobile station A201(A) receives packets only in the channel-set sub-frame 513. Therefore, the mobile station A201(A) estimates the channel state using the pilot signal 510 that precedes the sub-frame 513 by a given number of slots (e.g. six slots).

The mobile station A201(A) transmits the result of channel state estimation (channel state information) to the base station 200 in the slot next to the reception of the pilot signal 510 (511). The base station 200 performs scheduling on the basis of the channel state information and transmits the result of scheduling to the mobile station A201(A) (512). The base station 200 transmits data to the mobile station A201(A) according to the scheduling (514).

Figure 18:
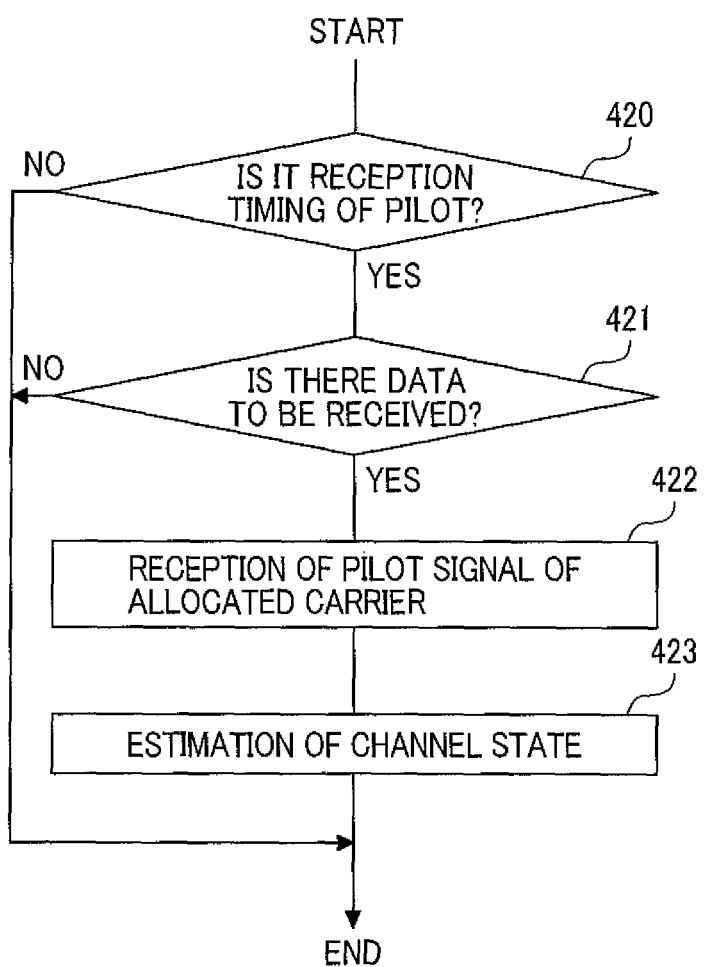
FIG. 18 is a flowchart of a channel state estimation process according to the first embodiment of this invention, where a channel set is allocated on the basis of time.

FIG. 18 is a flowchart of a channel state estimation process according to the first embodiment where a channel set is allocated on the basis of time, which is performed by the mobile station A201(A) in place of the process of FIG. 11.

The channel state estimation process is started and performed with an interrupt timed for each slot. First, the mobile station A201(A) checks whether it is time to receive a pilot signal (420). The reception of pilot signal (e.g., 510 in FIG. 17) is timed to precede the allocated channel-set sub-frame (e.g., 513 in FIG. 17) by a given length of time (e.g. six slots).

When it is not time to receive a pilot signal, the mobile station A201(A) ends the channel state estimation process. On the other hand, when it is time to receive a pilot signal, the mobile station A201(A) checks whether there is information to be received in this slot (421).

When the check shows that there is no information to be received, the mobile station A201(A) ends the channel state estimation process. On the other hand, when there is information to be received, the mobile station A201(A) receives the pilot signal of the allocated carrier (422). The mobile station A201(A) then estimates the channel state of the allocated carriers from the received pilot signal (423).

Figure 19:
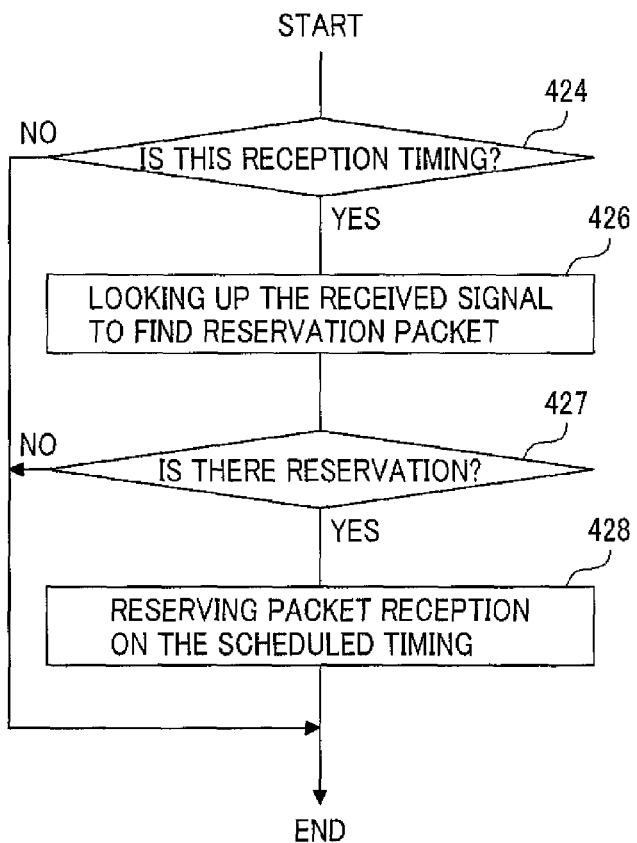
FIG. 19 is a flowchart of a scheduling result receiving process according to the first embodiment of this invention, where a channel set is allocated on the basis of time.

FIG. 19 is a flowchart of a scheduling result receiving process according to the first embodiment where a channel set is allocated on the basis of time, which is performed by the mobile station A201(A) in place of the process of FIG. 12.

After transmitting the channel state information, the mobile station A201(A) checks whether it is time to receive a result of scheduling from the base station 200 (424). The reception of a scheduling result (e.g., 512 in FIG. 17) is timed to be a given time (one slot) after the transmission of the channel state information (511 in FIG. 17).

When it is not time to receive a scheduling result, the mobile station A201(A) ends the scheduling result receiving process. On the other hand, when it is time to receive a scheduling result, the mobile station A201(A) receives a scheduling result and checks the scheduling of the allocated carriers (all carriers when the channel set is not allocated on the basis of frequency) (426).

The mobile station A201(A) checks whether the base station 200 transmits a packet over the allocated carriers (427). When no packet is transmitted from the base station 200, the mobile station A201(A) ends the scheduling result receiving process. On the other hand, when the base station 200 sends a packet, the mobile station A201(A) reserves reception of the packet in the channel of the corresponding slot and the corresponding carrier, on the basis of the scheduling result (428).

Figure 20:
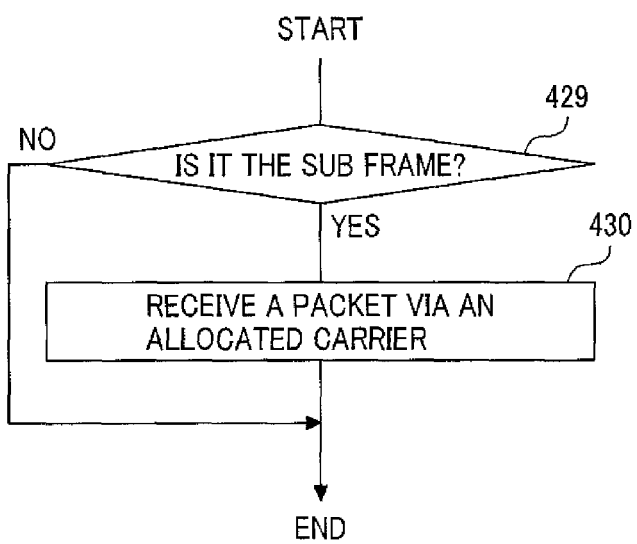
FIG. 20 is a flowchart of a packet receiving process according to the first embodiment of this invention, where a channel set is allocated on the basis of time.

FIG. 20 is a flowchart of a packet receiving process according to the first embodiment where a channel set is allocated on the basis of time, which is performed by the mobile station A201(A) in place of the process of FIG. 13.

This receiving process is started and performed with an interrupt timed for each slot. First, the mobile station A201(A) checks whether the slot is in the sub-frame of the allocated channel set (e.g., 513 in FIG. 17) (429).

When it is not in the sub-frame, the mobile station A201(A) ends the packet receiving process in this slot. On the other hand, when it is in the sub-frame, the mobile station A201(A) powers up packet receiving hardware and receives the packet over the allocated channel (430).

Also, in the first embodiment, a channel set may be allocated on the basis of both of frequency and time.

Figure 21:
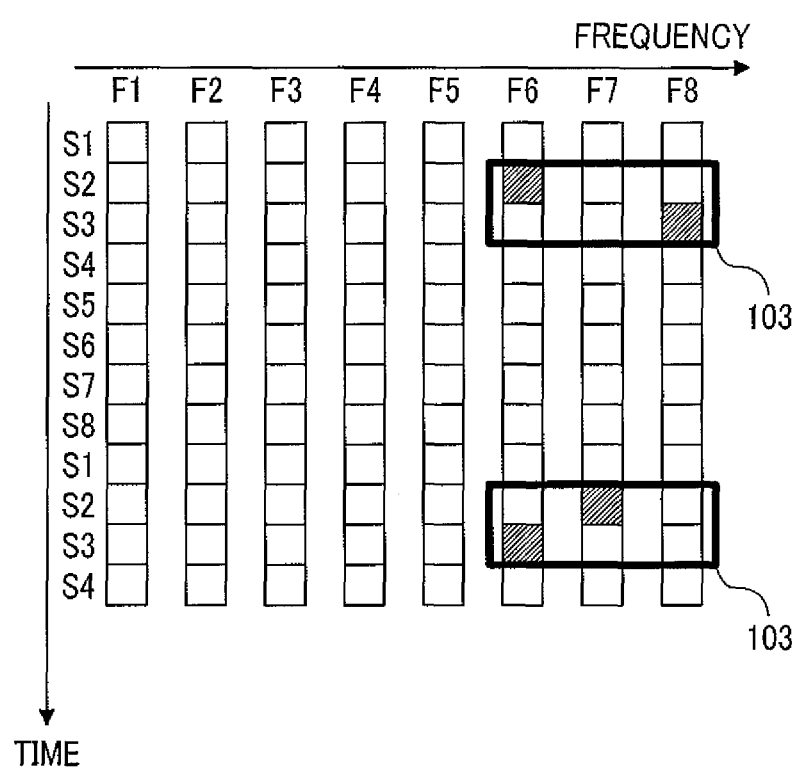
FIG. 21 is a channel schedule table according to the first embodiment of this invention, where a channel set is allocated on the basis of frequency and time.

FIG. 21 is a channel schedule table according to the first embodiment, in the case where a channel set is allocated on the basis of frequency and time. In the channel schedule table, the vertical axis shows time and the horizontal axis shows frequency.

When the base station 200 and the mobile station A201(A) perform low-rate communication, the base station 200 allocates to the mobile station A201(A) a channel set 103 including the carriers F6 to F8 and the times S2 and S3.

Subsequently, as described earlier, the base station 200 transmits packets to the mobile station A201(A) in the allocated channel sets. Specifically, in the first frame, the base station 200 transmits packets to the mobile station A201(A) over the carrier-F6 slot-S2 channel and the carrier-F8 slot-S3 channel. In the next frame, the base station 200 transmits packets to the mobile station A201(A) over the carrier-F7 slot-S2 channel and the carrier F6 slot-S3 channel.

As described so far, the first embodiment allocates channel sets on the basis of frequency and/or time, so the mobile station A201(A) receives packets only in the slots where packets may be received, which allows the mobile station A201(A) to reduce power consumption.

Conventionally, even when the mobile station A201(A) performs low-rate communication, packets may be communicated on all the carriers F1 to F8. This requires the mobile station A201(A) to perform the channel state estimation (301) and the channel state information transmission (302) about all the carriers.

In contrast, according to the first embodiment, the channel state estimation 301 and the channel state information transmission 302 are performed only about the carriers F6 to F8 included in the allocated sub-band 101. Reducing the number of carriers requiring the channel state estimation 301 and the like reduces power consumption for the pilot signal reception, the channel state estimation (301), etc.

Also, reducing the number of carriers requiring the channel state information transmission (302) reduces the amount of channel state information data transmitted to the base station, which can reduce the amount of processing and the power consumption for the data transmission.

Figure 31:
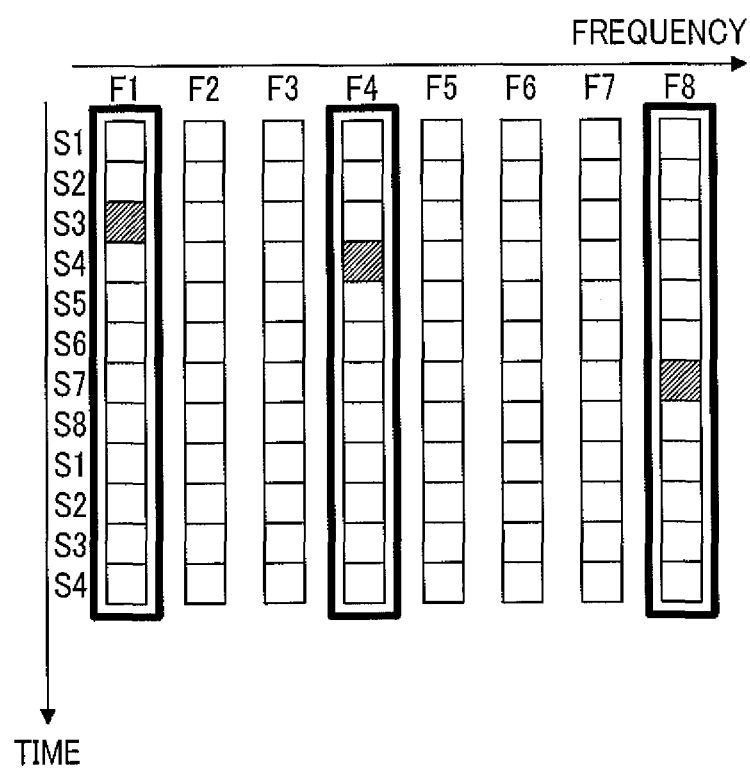
FIG. 31 is a channel schedule table described in JP 2003-9240 A.

Also, the power consumption of the mobile station A201(A) is reduced as compared with the example (FIG. 31) in which the frequencies of carriers scheduled for the mobile station A are discontinuous.

In other words, in performing the channel state estimation (301) about a plurality of carriers, the mobile station A201(A) requires the AD converter 220 which is capable of dealing with a sampling clock covering all carrier frequencies that might bring packets. Enlarging the range of sampling clock for the AD converter 220 increases power consumption.

Thus, in a case where carrier frequencies scheduled for the mobile station A are discontinuous as shown in the conventional example (FIG. 31), the mobile station A201(A) uses a wider range of carrier frequencies even with the same number of carriers allocated. Accordingly, a range of sampling clock becomes wider, leading to lessen the power consumption reduction effect. In contrast, according to the first embodiment, carriers at continuous frequencies are allocated to the mobile station A201(A), so the sampling clock range of the AD converter 220 can be minimized. The mobile station A201(A) of the embodiment thus consumes less power.

Also, in the first embodiment, a channel set is allocated on the basis of time, so the mobile station A201(A) expects to receive packets only in channels of particular slots, which allows the mobile station A201(A) to perform the carrier channel state estimation (301) and the channel state information transmission (302) only about the particular slots. Thus the mobile station A201(A) consumes less power.

FIGS. 22A, 22B, and 22C are graphs showing carrier channel states in the first embodiment, where the vertical axes show time and the horizontal axes show channel state.

In wireless communication, a higher value of channel state S/(I+N) allows signal transmission with higher coding rate or larger multi-value modulation, which offers higher carrier utilization rate. The channel states S/(I+N) vary in time because of movements of the mobile stations 201 and environmental variations, and the channel state of each mobile station 201 varies independently.

FIG. 22A is a graph showing carrier channel states in a case where three mobile stations A201(A), B201(B), and C201(C) communicate with the base station 200. The base station 200 selects a mobile station 201 that presents a highest value among the values of channel state S/(I+N) reported from the three mobile stations 201 and allows that mobile station 201 to use the carrier.

FIG. 22B is a graph showing carrier channel states in a case where two terminals A201(A) and B201(B) communicate with the base station 200, and FIG. 22C is a graph showing a carrier channel state in a case where a single mobile station A201(A) communicates with the base station 200.

It is appreciated, by comparing these graphs, that the carrier channel state S/(I+N) increases as the number of mobile stations 201 increases, causing user diversity effect. Thus, the carrier utilization rate is enhanced.

In the first embodiment, the base station 200 allocates a same carrier to a plurality of mobile stations 201 and thus increases the carrier utilization rate.

Next, a second embodiment of the invention will be described.

FIG. 23 is a sequence chart showing a packet scheduling process according to the second embodiment, which is performed in the step 300 of the channel set allocation process (FIG. 5).

The packet scheduling process of the second embodiment differs from the packet scheduling process (FIG. 6) of the first embodiment in that the step (305) in which the base station 200 notifies the mobile station A201(A) of the result of scheduling and the step (306) in which the mobile station A201(A) receives the result of scheduling are omitted. The other steps are the same as those of the packet scheduling in which the result of scheduling is reported. The same steps are denoted by the same reference characters and are not described again here.

It should be noted that, unlike in the case where the result of scheduling is reported, the mobile station A201(A) constantly waits for reception from channels that may bring packets and monitors to see whether any packet destined for the mobile station A201(A) is transmitted.

In other words, in the second embodiment, where the result of scheduling is not reported, the mobile station A201(A) is always waiting for reception and therefore consumes more power than when the mobile station A201(A) is notified of the result of scheduling.

However, for example, when the carrier frequency is 2 GHz and the moving rate is 60 Km/h, the channel state varies at about 1110 Hz. Thus, the scheduling must be performed every several ms, so it is technically difficult to notify the mobile station 201 of the result of scheduling in advance. Therefore, the third-generation mobile communication system, cdma2000 1xEV-DO, adopts a packet scheduling scheme not involving notification of scheduling results.

Figure 24:
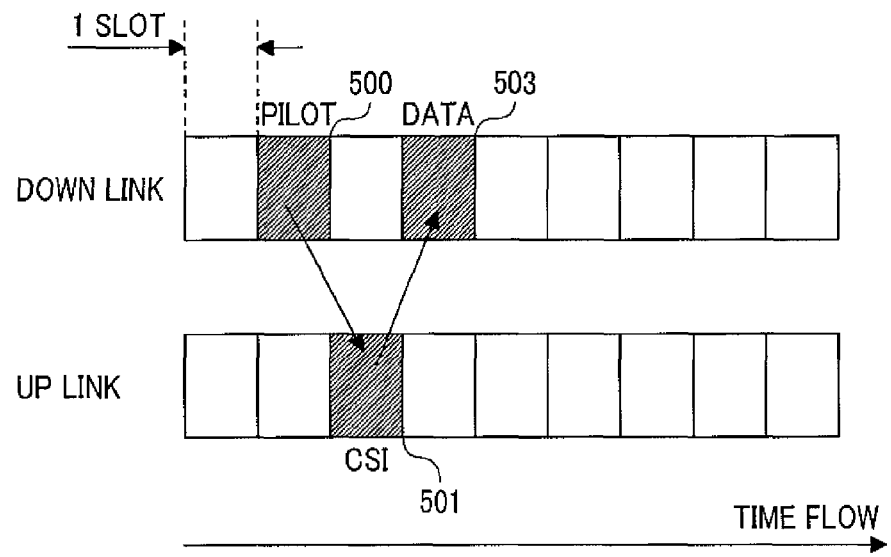
FIG. 24 is a channel timing chart according to the second embodiment of this invention.

FIG. 24 is a channel timing chart according to the second embodiment. The hatched portions in FIG. 24 show timing of communication performed between the base station 200 and the mobile station A201(A).

The base station 200 transmits a pilot signal within the communication area (500). The mobile station A201(A) receives the pilot signal and estimates the channel state from the received pilot signal. Then, the mobile station A201(A) transmits the result of channel state estimation (channel state information) to the base station 200 in the slot next to the slot in which mobile station A201(A) received the pilot signal (501).

The base station 200 receives the channel state information and performs scheduling. Then, when the base station 200 makes a schedule for the mobile station A201(A), the base station 200 transmits data to the mobile station A201(A) in the slot next to the slot in which the base station received the channel state information (503).

Figure 25:
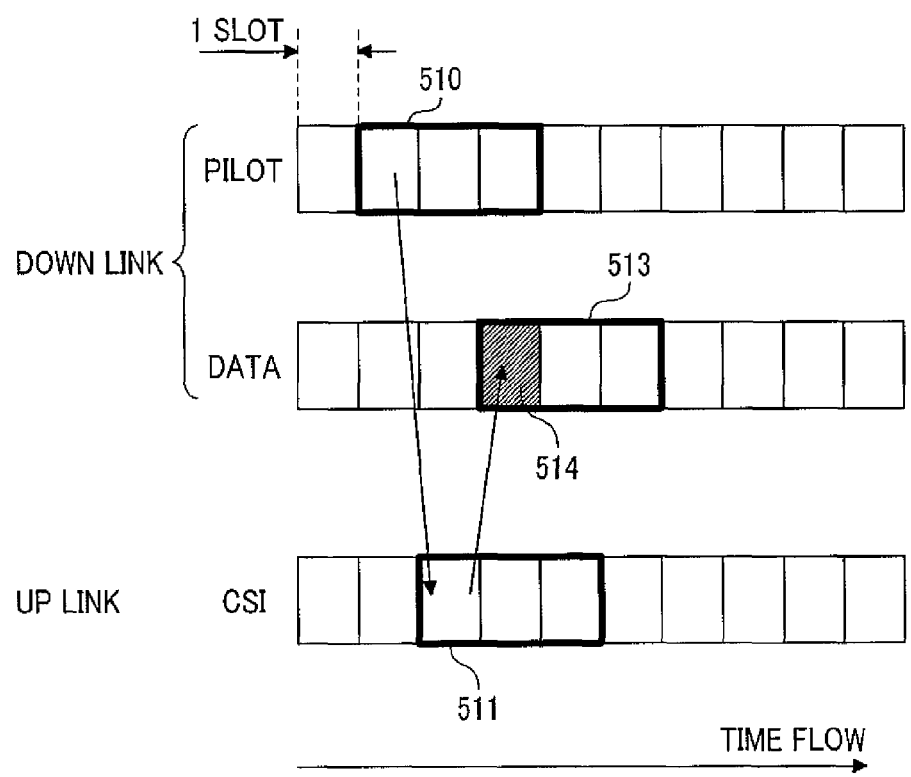
FIG. 25 is a channel timing chart according to the second embodiment of this invention, where a channel set is allocated on the basis of time and the result of scheduling is not reported.

FIG. 25 is a channel timing chart according to the second embodiment, in a case where a channel set is allocated on the basis of time and the result of scheduling is not reported. The portions surrounded by bold lines show slots in which the base station 200 and the mobile station A201(A) associate with each other. The hatched portion denotes a slot 514 in which the base station 200 transmits a packet to the mobile station A201(A).

The channel set is allocated on the basis of time, so the mobile station A201(A) receives packets only in the sub-frame 513. Therefore, the mobile station A201(A) estimates the channel state using the pilot signal 510 that precedes the sub-frame 513 by a given number of slots (two slots).

The mobile station A201(A) transmits the result of channel state estimation (channel state information) to the base station 200 in the slot next to the slot in which the mobile station A201(A) received the pilot signal (511). Since the base station 200 does not have to notify the mobile station A201(A) of the result of scheduling, the base station 200 performs scheduling of the slot 513 next to the slot in which the channel state information was received. Then, the base station 200 transmits packets to the mobile station A201(A) according to the scheduling (514).

When the result of scheduling is not reported, in a conventional example, the mobile station A201(A) cannot tell when a packet is transmitted and therefore has to wait for reception in all slots.

According to the second embodiment, as described above, the base station 200 allocates to the mobile station A201(A) a channel set of a sub-frame (a frame formed of slots that are continuous in time), to thereby allowing the mobile station A201(A) to receive packets only in the slots included in the allocated channel set. This allows the mobile station A201(A) to save the amount of processing and consumption power for reception.

Next, a third embodiment of this invention will be described.

Figure 26:
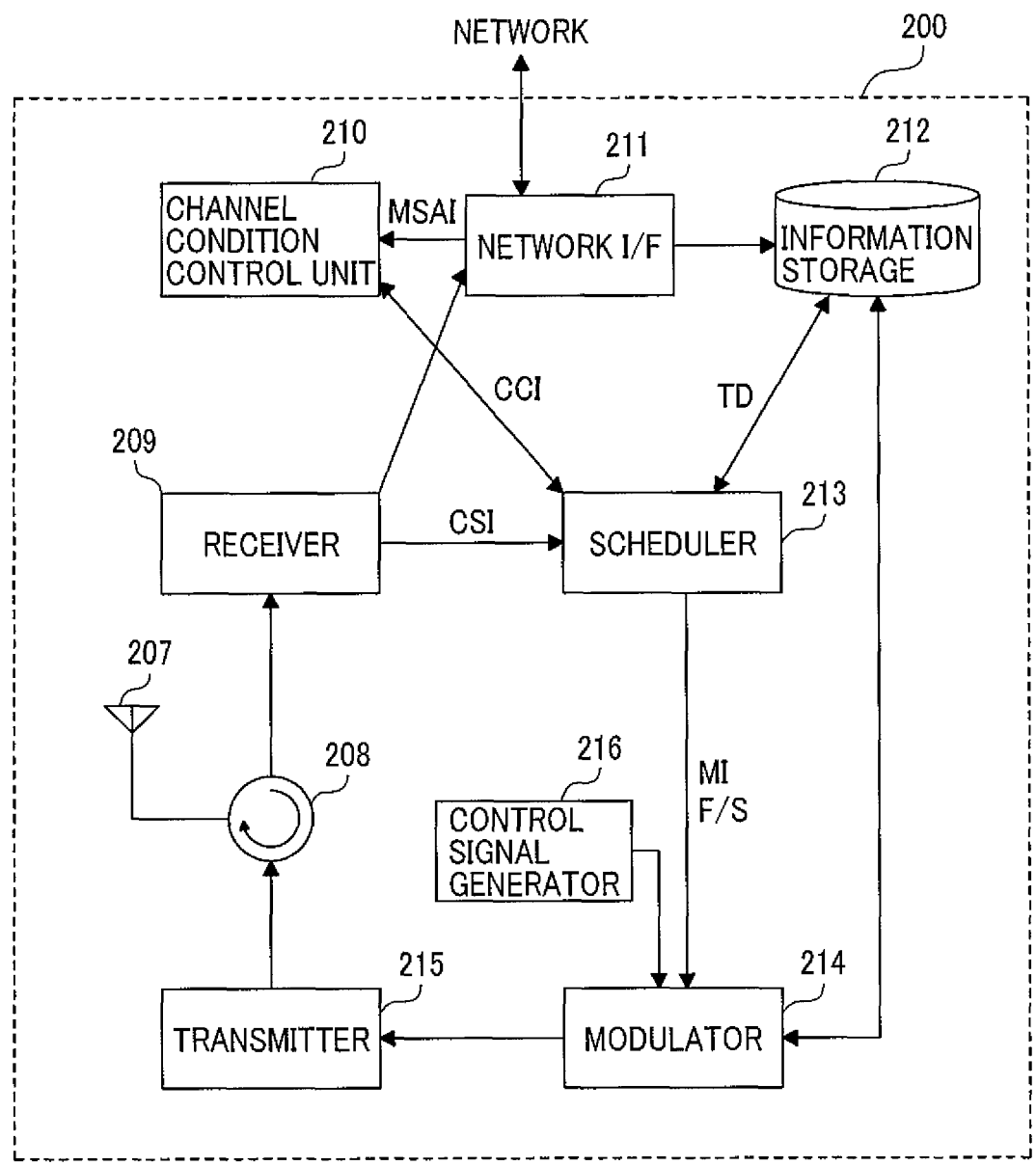
FIG. 26 is a block diagram of a base station 200 according to a third embodiment of this invention.

FIG. 26 is a block diagram of a base station 200 according to the third embodiment.

In the third embodiment, the base station 200 differs from the base station 200 of the first embodiment shown in FIG. 2 in that information about the receiving abilities of mobile stations is transmitted from the network to the channel condition control unit 210.

When a signal from the network is information about the receiving ability of a mobile station 201, the network interface 211 sends the information to the channel condition control unit 210. In other respects, the configuration of the base station 200 of this modification is the same as that of the base station 200 of the first embodiment. Therefore the same components are denoted by the same reference characters and are not described again here.

Figure 27:
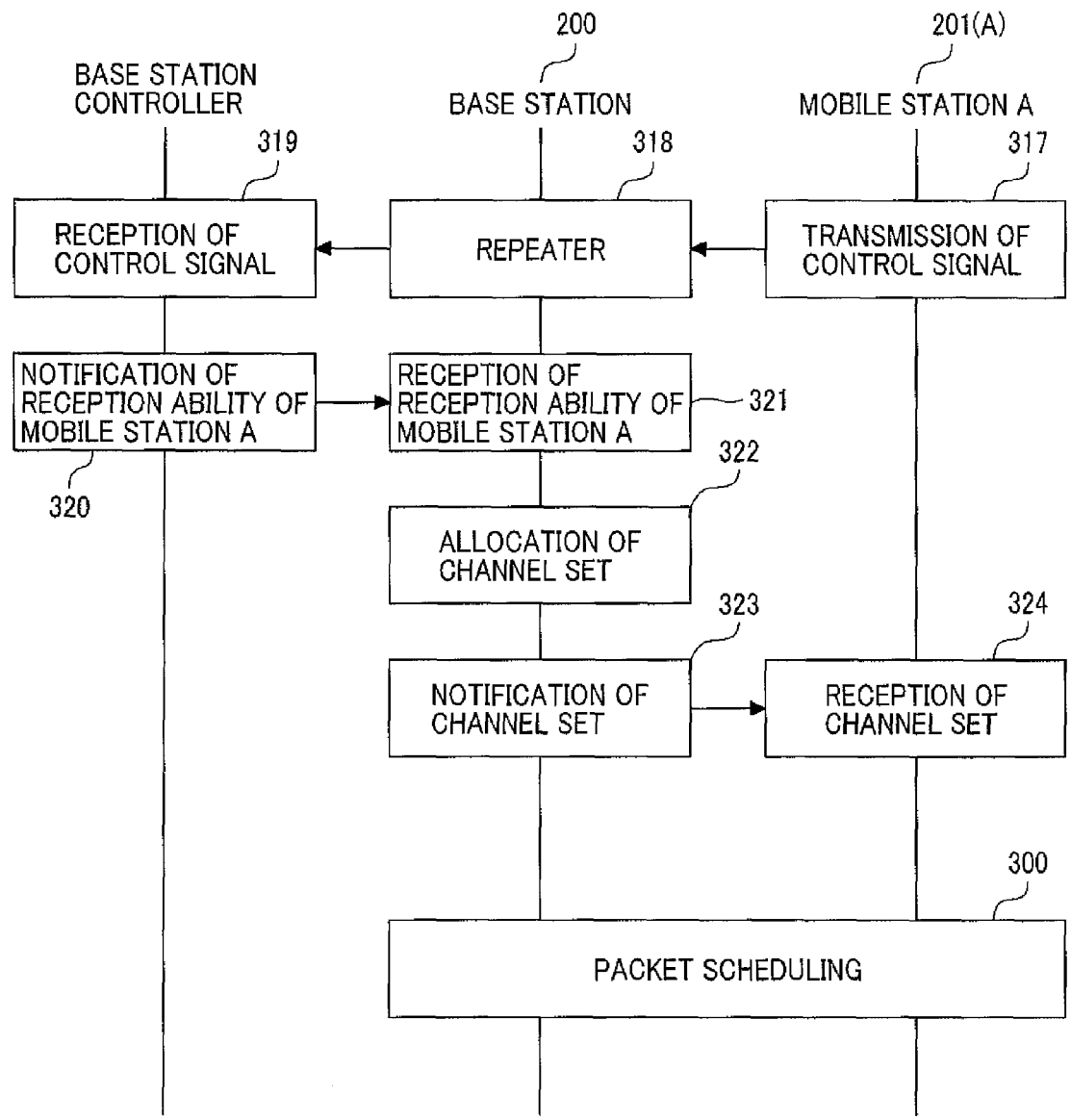
FIG. 27 is a channel set sequence chart according to the third embodiment of this invention.

FIG. 27 is a channel set sequence chart according to the third embodiment, where the base station 200 is notified of the receiving ability of the mobile station A201(A) from a base station controller.

First, the mobile station A201(A) sends a control signal including an ID, position registration, etc. (317). The base station 200 receives the control signal from the mobile station A201(A). Then, the base station 200 transfers the received control signal to the base station controller (318).

The base station controller receives the control signal about the mobile station A201(A) (319). Then, using the ID of the mobile station included in the received control signal, the base station controller searches receiving ability information stored in a storage device for the receiving ability of the mobile station A201(A). Then, the base station controller notifies the base station 200 of the obtained receiving ability (320).

The base station 200 receives the receiving ability of the mobile station A201(A) (321) and allocates a channel set that satisfies the receiving ability (322). The base station 200 notifies the mobile station A201(A) of the allocated channel set using a control channel (323). The base station 200 then performs scheduling only about the allocated channel set (300).

The mobile station A201(A) receives the channel-set notification (313). The mobile station A201(A) then monitors only the allocated channel set in the subsequent communication to receive packets from the base station 200.

Next, a fourth embodiment of this invention will be described.

Figure 28:
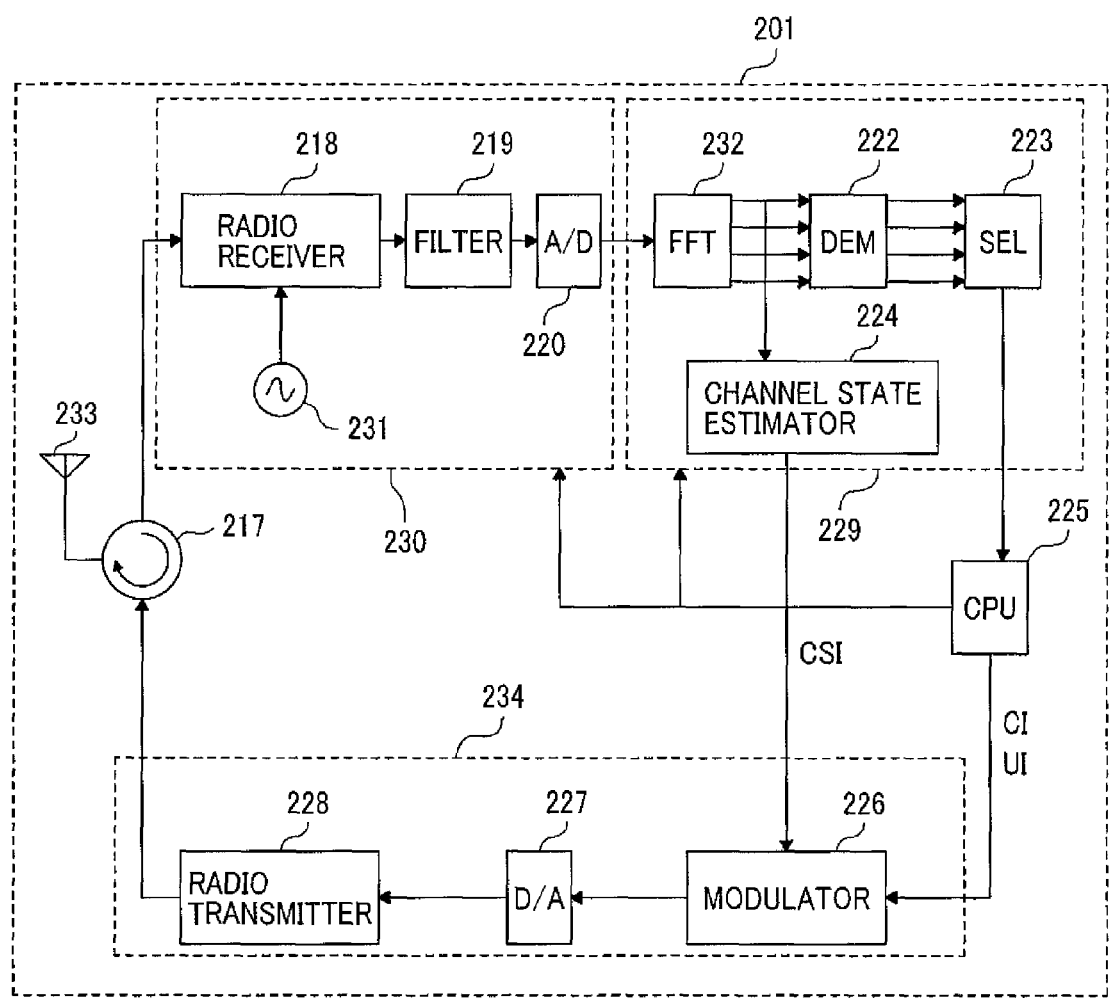
FIG. 28 is a block diagram of a mobile station according to a fourth embodiment of this invention.

FIG. 28 is a block diagram of a mobile station 201 according to the fourth embodiment, which adopts the OFDMA.

In the case of the OFDMA, the mobile station 201 includes an FFT unit 232 in place of the aforementioned filter bank 221 of the FDMA mobile station 201 (FIG. 3) of the first embodiment. The FFT unit 232 performs the Fourier transform to separate signals into sub-carriers. The sampling frequency for the signal inputted to the FFT unit 232 is varied depending on the number of frequency channels (bandwidth) of the previously allocated channel set. The number of taps of the FFT unit 232 is also varied according thereto. Since the sub-carrier band is (sampling frequency/number of taps of the FFT unit), the sampling frequency and the number of taps of the FFT unit are varied so that this value is constant, whereby particular frequencies can be extracted without changing the sub-carrier band.

In other respects, the configuration is the same as that of the FDMA mobile station 201 of the first embodiment. The same components as those of the FDMA mobile station 201 (FIG. 3) are denoted by the same reference characters and are not described again here.

FIGS. 29A to 29D show spectra exhibited during a process of extracting a signal of a particular carrier according to the fourth embodiment, which shows an example that adopts the OFDMA.

Figure 29A:
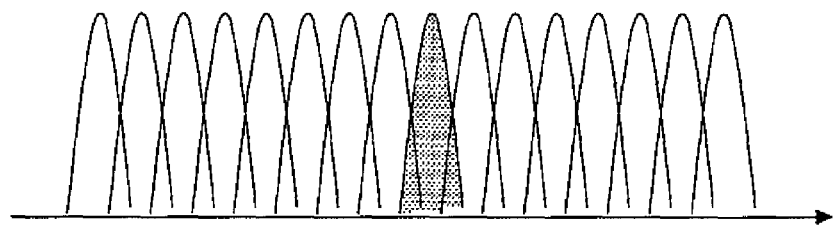
FIGS. 29A to 29D show spectra exhibited during a process of extracting a signal of a particular carrier according to the fourth embodiment of this invention.

The antenna 233 receives a signal having a spectrum as shown in FIG. 29A. In the OFDMA signal, the signals of sub-carriers partially overlap with each other.

Figure 29B:
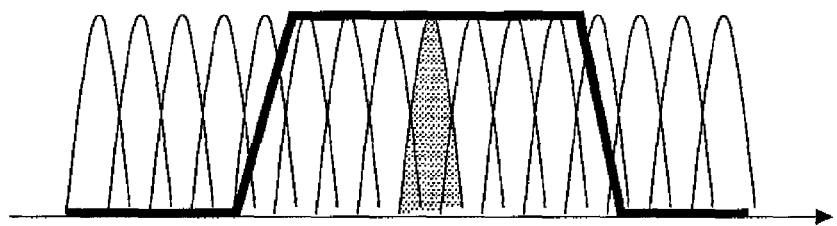

With these signals, the filter 219 denoted by the bold line in FIG. 29B extracts a portion necessary for the mobile station 201. The filter 219 extracts the signal portion so that it includes the allocated channel set. Therefore, the output from the filter 219 is a wideband signal including a plurality of sub-carriers (e.g., in this embodiment, a wideband signal including seven sub-carriers).

Figure 29C:
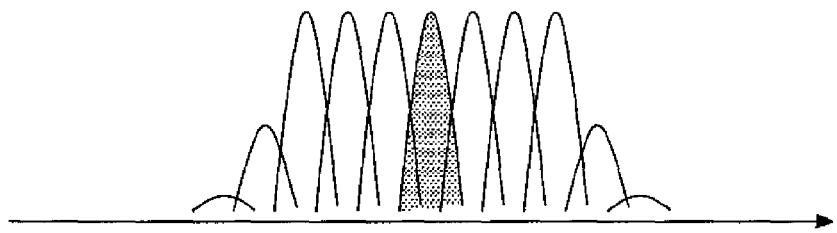
Figure 29D:
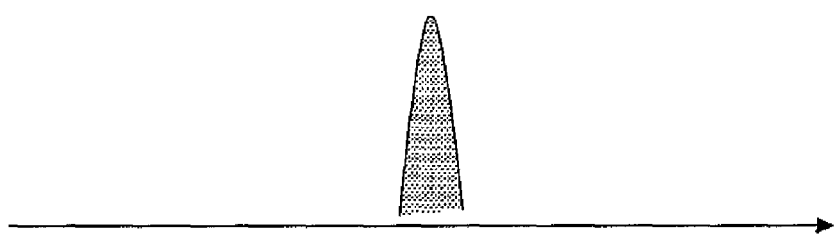

FIG. 29C shows the signal extracted by the filter. The FFT 232 separates the signal into individual sub-carriers. FIG. 29D shows the spectrum of one of the separated sub-carrier signals. In the OFDMA system, one channel may be formed of one sub-carrier, or one channel may be formed of a plurality of sub-carriers.

While the present invention has been described in detail and pictorially in the accompanying drawings, the present invention is not limited to such detail but covers various obvious modifications and equivalent arrangements, which fall within the purview of the appended claims.

What is claimed is:

1. A wireless communication method for communicating between a base station and a plurality of terminals using M channels, comprising
transmitting, by the base station, a notification indicating N (N is integer, N<M) channels to be allocated to each terminal;
receiving, by each terminal, the notification;
judging, among the M channels, whether each of the N channels is to be monitored or not on the basis of notification;
starting, by each terminal, monitoring states of the N channels to be monitored on the basis of the step of judging;
transmitting, by each terminal, to the base station, channel information related only the monitored N channels and not transmitting, by each terminal to the base station, channel information related to channels other than the monitored N channels;
receiving, by the base station, a schedule of data packets to be transmitted, on the basis of the channel information transmittal from the terminals; and
executing, by the base station, the schedule of data packets to be transmitted to the terminals, on the basis of the channel information.

2. The wireless communication method according to claim 1, wherein:
the channels are configured to provide a plurality of time slots for each frequency region,
the notification includes which time slots are to be monitored related to the N channels, and
the step of starting monitoring performs monitoring of the time slots indicated in the notification.

3. The wireless communicating method according to claim 1,
further comprising the steps of:
transmitting, by the base station, a pilot signal to each terminal when the step of starting monitoring is performed,
receiving the pilot signal on the monitored channel; and
estimating, by the terminal, a channel state to be monitored on the basis of the step of receiving the pilot signal
wherein the channel information includes a channel state which is estimated.

4. The wireless communicating method according to claim 1, further comprising, executing by the terminal, an initialized operation responsive to the notification when the step of starting monitoring is performed.

5. A wireless communication method for communicating between a base station and a plurality of terminals using M channels, comprising:
transmitting, by the base station, a notification indicating N (N is integer, N<M) channels to be allocated to each terminal;
receiving, by each terminal, the notification;
judging, among the M channels, whether each of the N channels is to be monitored or not on the basis of notification;
starting, by each terminal, monitoring states of the N channels to be monitored on the basis of the step of judging;
transmitting, by each terminal, to the base station, channel information related to only the monitored N channels and not transmitting, by each terminal, to the base station, channel information related to channels other than the monitored N channel; and
executing, by the base station, a schedule of data packets to be transmitted to the terminals, on the basis of the channel information.

6. The wireless communication method according to claim 5, wherein:
the channels are configured to provide a plurality of time slots for each frequency region,
the notification includes which time slots are to be monitored related to the N channels, and
the step of starting monitoring performs monitoring of the time slots indicated in the notification.

7. A wireless communication method for communicating between a base station and a plurality of terminals using a plurality of channels, comprising:
transmitting, by the base station, information to judge whether a part of the plurality of channels, less than a total number of the plurality of channels, is to be monitored or not to each terminal;
receiving, by each terminal, the information as to whether the part of the channels are to be monitored or not;
monitoring, by each terminal, states of only the part of the channels to be monitored on the basis of the information received from the base station;
transmitting, by each terminal to the base station, channel information related to states of only the part of the channels to be monitored, and not transmitting channel information related to states of channels other than the channels to be monitored;
executing, by the base station, a schedule of data packets to be transmitted to the terminals, on the basis of the channel information.

8. The wireless communication method according to claim 7, wherein: the channels are configured to provide a plurality of time slots for each frequency region,
the information indicates time information related to time slots to be monitored, and
the step of monitoring performs monitoring of the time slots corresponding to the time information.

9. The wireless communication method according to claim 7, wherein:
the channels are configured to provide a plurality of frequency regions for each time slot,
the information indicates frequency information related to frequency region to be monitored, and
the step of monitoring performs monitoring of the frequency region corresponding to the frequency information.

10. A base station for wirelessly communicating with a plurality of terminals using a plurality of channels, comprising:
a transmitter configured to transmit information to judge whether a part of the plurality of channels, less than the total number of the plurality of channels, is to be monitored or not to each terminal;
wherein each terminal is configured to monitor states of only the part of channels to be monitored on the basis of the information received from the transmitter, and to transmit channel information related to the states of only the part of the channels to be monitored, and not to transmit information related to states of channels other than the channels to be monitored,
the base station further including a processor configured to execute a schedule of data packets to be transmitted to the terminals, on the basis of the channel information received by the base station from the terminals.

11. The base station according to claim 10, wherein:
the channels are configured to provide a plurality of time slots for each frequency region,
the information transmitted by the base station to the terminals indicates time information related to time slots to be monitored, and
each of the terminals is configured to perform monitoring of the time slots corresponding to the time information.

12. The base station according to claim 10, wherein:
the channels are configured to provide a plurality of frequency regions for each time slot,
the information transmitted by the base station to the terminals indicates frequency information related to frequency regions to be monitored, and
each of the terminals is configured to perform monitoring of the frequency region corresponding to the frequency information.

13. A wireless communication system including a base station and a plurality of terminals and configured for communicating between the base station and the plurality of terminals using M channels, comprising:
means for transmitting, by the base station, a notification indicating N (N is integer, N<M) channels to be allocated to each terminal;
means for receiving, by each terminal, the notification;
means for judging, among the M channels, whether each of the N channels is to be monitored or not on the basis of notification;
means for starting, by each terminal, monitoring states of the N channels to be monitored on the basis of the step of judging;
means for transmitting, by each terminal, to the base station, channel information related to only the monitored N channels and not transmitting, by each terminal, to the base station, channel information related to channels other than the monitored N channels; and
means for executing, by the base station, a schedule of data packets to be transmitted to the terminals, on the basis of the channel information.

14. The wireless communication system according to claim 13, wherein:
the channels are configured to provide a plurality of time slots for each frequency region,
the notification includes which time slots are to be monitored related to the N channels, and
each terminal is configured to perform monitoring of the time slots indicated in the notification.

* * * * *